US012686241B1

(12) United States Patent
Venem et al.

(10) Patent No.: US 12,686,241 B1
(45) Date of Patent: Jul. 21, 2026

(54) TOW BAR LIFT ASSIST SYSTEM AND METHOD

(71) Applicant: FAST Global Solutions, Inc., Glenwood, MN (US)

(72) Inventors: Michael Venem, Nebraska City, NE (US); Taylor S. Stulen, Hawick, MN (US); Garret G. Hoeper, Alexandria, MN (US)

(73) Assignee: FAST Global Solutions, Inc., Glenwood, MN (US)

( * ) Notice: Subject to any disclaimer, the term of this patent is extended or adjusted under 35 U.S.C. 154(b) by 290 days.

(21) Appl. No.: 18/207,107

(22) Filed: Jun. 7, 2023

Related U.S. Application Data

(60) Provisional application No. 63/349,955, filed on Jun. 7, 2022.

(51) Int. Cl.
B60D 1/46 (2006.01)
B60D 1/155 (2006.01)

(52) U.S. Cl.
CPC ............. B60D 1/465 (2013.01); B60D 1/155 (2013.01)

(58) Field of Classification Search
CPC ................................ B60D 1/465; B60D 1/155
See application file for complete search history.

(56) References Cited

U.S. PATENT DOCUMENTS 3,134,461 A * 5/1964 Klemm ...................... B60T 7/20
188/78
5,090,719 A * 2/1992 Hanaoka ................ B62D 13/04
280/445

5,240,273 A * 8/1993 Stead ........................ B60D 1/34
280/489
9,744,955 B1 8/2017 Hoeper et al.
11,667,228 B2 * 6/2023 Hoeper ................ B62D 53/005
410/94
2020/0156873 A1 5/2020 Baer
2023/0415526 A1 * 12/2023 Hoeper .................. B60D 1/242

FOREIGN PATENT DOCUMENTS

GB 2551313 A * 12/2017 ............. B60T 13/08
JP 2003063222 A * 3/2003
WO WO2019108912 A1 6/2019
WO WO2022081770 A1 4/2022

* cited by examiner

*Primary Examiner* — Kevin Hurley

(74) *Attorney, Agent, or Firm* — Christensen, Fonder, Dardi & Busse PLLC; Timothy J. Busse

(57) ABSTRACT

A lift assist system for a tow bar. The system exerts a force exerted on the tow bar to generate an upward moment that counters a downward moment generated by the weight of the tow bar assembly. The greatest upward moments are generated from a lowered configuration through at least a horizontal configuration of the tow bar, thereby providing the greatest degree of lift assistance for the operator when the downward moments are the greatest. A stop assembly may be included that limits how far the tow bar can arc below the equilibrium height in normal operation to prevent the tow bar from reaching the ground during a free fall, thus providing a measure of safety against injury to operating personnel. The lift assist system may depend from flexible suspension members to protect components from excessive stresses in the event of a forced grounding of the tow bar.

8 Claims, 22 Drawing Sheets

440

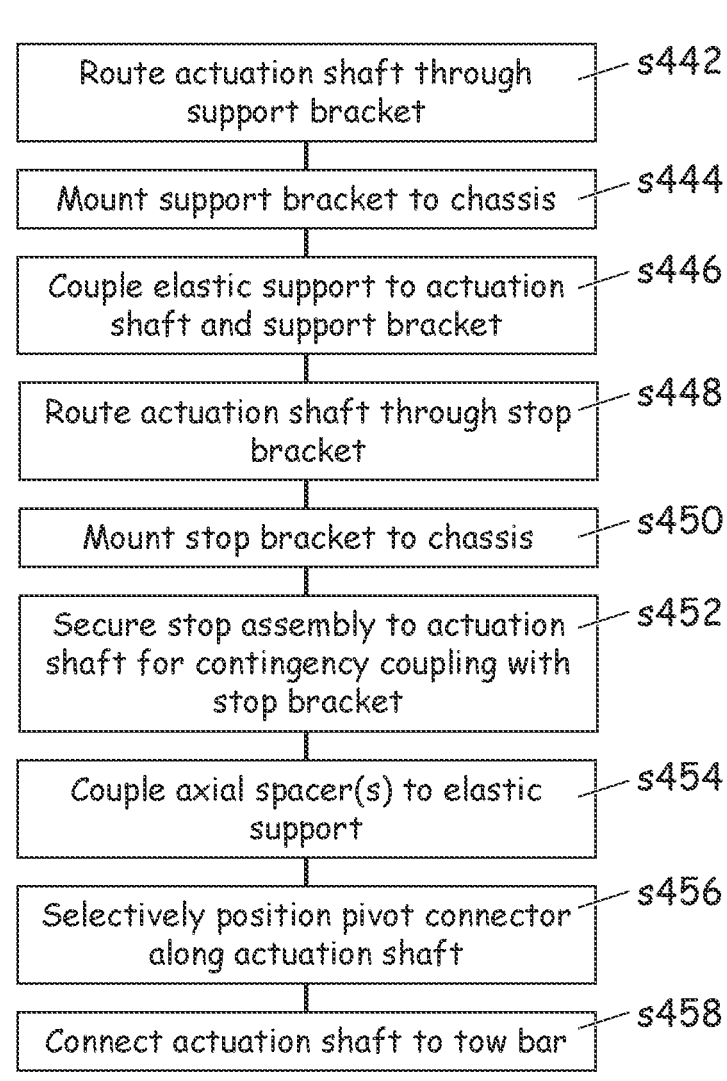

Route actuation shaft through support bracket ——— s442

Mount support bracket to chassis ——— s444

Couple elastic support to actuation shaft and support bracket ——— s446

Route actuation shaft through stop bracket ——— s448

Mount stop bracket to chassis ——— s450

Secure stop assembly to actuation shaft for contingency coupling with stop bracket ——— s452

Couple axial spacer(s) to elastic support ——— s454

Selectively position pivot connector along actuation shaft ——— s456

Connect actuation shaft to tow bar ——— s458

FIG. 28

TOW BAR LIFT ASSIST SYSTEM AND METHOD

RELATED APPLICATIONS

This patent application claims the benefit of U.S. Provisional Patent Application No. 63/349,955, filed Jun. 7, 2022, the disclosure of which is hereby incorporated by reference in its entirety.

FIELD OF THE DISCLOSURE

This disclosure is directed generally to tow bar systems for towed vehicles and more specifically to lift assist and vertical positioning of such tow bar systems.

BACKGROUND OF THE DISCLOSURE

Heavy duty tow bar systems are used with towed vehicles such as high capacity cargo dollies and trailers for transporting heavy payloads. Such tow bar systems are heavy and require significant physical exertion by the operator when attaching to a towing vehicle or when positioning the tow bar in an upright configuration, for example when setting the brakes of a tow bar actuated brake system.

International Patent Application Publication No. WO 2022/081770 to Hoeper, et al., assigned to the owner of the present application, is directed to a cam-actuated lift assist for tow bar activated brake systems. The cam-actuated system includes a cam coupled to the tow bar and against which a cam follower exerts a force to assist the operator in rotating the tow bar upwards and setting the brake. A system that provides the same or various features of the cam-actuated system at reduced complexity and cost would be welcome.

SUMMARY OF THE DISCLOSURE

Various embodiments of the disclosure provide a tow bar lift assist system that exerts a force on a tow bar assembly to generate an upward moment that counters a downward moment generated by the weight of the tow bar assembly, thereby assisting the operator in rotating the tow bar upward. Conventional tow bar systems are known that include a so-called "tow bar holdup" mechanism, wherein a spring is arranged for coupling with a tow bar assembly in a lowered configuration to suspend the tow bar above the ground. The A225513D Cargo Dolly, manufactured by FAST Global Solutions of Glenwood, Minnesota, U.S.A., is an example of a towed vehicle that includes a tow bar holdup mechanism. Such tow bar holdup systems are engaged over a small portion of the rotational range of the tow bar when the tow bar assembly is in the lowered configuration. As such, conventional tow bar holdup mechanisms do not aid the operator in lifting the tow bar substantially beyond the lowered configuration. Because the downward moment of the tow bar assembly is the greatest when the tow bar is proximate the horizontal configuration, tow bar holdup mechanisms are insufficient for providing meaningful lift assist to the operator.

In contrast, the disclosed lift assist system provides the greatest degree of lift assistance when the downward moment of the tow bar assembly is greatest, specifically from the lowered configuration through and beyond a horizontal configuration. In some embodiments, the force exerted on the tow bar can be tailored to totally counter the downward moment generated by the weight of the tow bar when in a lowered configuration, thereby suspending a free end of the tow bar at an equilibrium height above the ground. The equilibrium height may be adjusted to a desired height, for example for positioning a free end of the tow bar proximate a typical height for attachment to a towing vehicle.

In some embodiments, the lift assist system includes a stop assembly that limits how far the tow bar can arc below the equilibrium height in normal operation, for example when the tow bar is released and falls towards the ground. The stop assembly can be tailored to prevent the tow bar from reaching the ground during a free fall, thereby providing a measure of safety against injury to operating personnel. The stop assembly can also mitigate damage to the lift assist system by preventing excessive deformation of the lift assist components.

In some embodiments, the lift assist system includes provisions that militate against damage in the event the free end of the tow bar is forced to the ground (herein referred to as a "forced grounding"), for example when the tow bar is accidentally driven over by heavy equipment. The stop mechanism may depend from flexible suspension members that provide sufficiently stiff resistance to prevent collision with the ground under normal operating conditions, but will flex when the tow bar forced grounding. The flexing of the flexible suspension members absorbs the deflection that would otherwise be absorbed by the lift assist system, thereby preventing damage to the lift assist components.

The disclosed lift assist system is comprised of simple mechanical components, the functions of which, in light of this disclosure, are readily understood and implemented by artisans in the related arts. The lift assist system may also be integrated into a tow bar actuated brake system, thus requiring fewer additional components than would a stand alone lift assist system. The simplicity of and the lack of redundancy of components controls costs. Also, because of the simplicity aspect and ability to integrate into tow bar actuated brake systems, the disclosed lift assist system can readily be retrofitted into existing towed vehicles.

Structurally, in various embodiments of the disclosure, a towed vehicle with tow bar lift assist system is disclosed, comprising a chassis supported by a plurality of assemblies, wherein lower extremities of the tire assemblies defines a ground plane. A pivot pin is coupled to the chassis and defining a pivot axis, and a tow bar assembly coupled about the pivot pin for rotation about the pivot axis, the tow bar assembly including a tow bar that defines a tow bar axis that is perpendicular to the pivot axis and extends through a free end of the tow bar, the tow bar assembly including a linkage arm that extends radially outward from the rotation axis. A lift assist system, includes a pivot connector directly connected to the linkage arm of the tow bar assembly, an actuation shaft coupled to the pivot connector and extending beneath or through the chassis, and an elastic support that extends beneath or through the chassis and is coupled to the actuation shaft. A reference plane is defined as being coplanar with the pivot axis and parallel to the ground plane. The tow bar defines a lowered configuration wherein the free end of the tow bar is below the reference plane. The tow bar defines a horizontal configuration wherein the tow bar axis is coplanar with the reference plane. The elastic support exerts an assistance force on the actuation shaft to generate an upward moment of the tow bar assembly about the pivot axis, the upward moment suspending the free end of the tow bar assembly at an equilibrium height above the ground plane in the lowered configuration, the tow bar axis defining an equilibrium angle relative to the reference plane at the lowered configuration. The upward moment is generated from the lowered configuration through the horizontal configuration.

In some embodiments, the towed vehicle includes a support bracket to which the elastic support is coupled for generation of the assistance force. A load assembly may include the pivot connector, the elastic support, and the support bracket. In some embodiments, an actuation length of the load assembly is defined from a pivot axis of the pivot connector to a rearward registration surface defined by the support bracket, wherein the actuation length defines an equilibrium length when the tow bar assembly is in the lowered configuration. In some embodiments, the towed vehicle includes means for changing the equilibrium length, and may include means for shifting the equilibrium length along the actuation axis.

The support bracket may be coupled to and beneath or within the chassis. In some embodiments, the actuation shaft passes through the support bracket. The elastic support may be collinear with the actuation shaft. In some embodiments, the elastic support is in compression for generation of the assistance force. In some embodiments, the tow bar defines a raised configuration wherein the elevation range is between 80 degrees and 110 degrees inclusive, and the assistance force is generated from the lowered configuration to the raised configuration.

An elevation angle is defined between the tow bar axis and the reference plane. An equilibrium angle is defined as the elevation angle in the lowered configuration. An elevation assistance range is defined as a range of the elevation angle wherein a ratio of an exertion force required for upward rotation of the tow bar assembly with the lift assist system to an exertion force require for upward rotation of the tow bar assembly without the lift assist system is less than 0.5. In some embodiments, the elevation assistance range includes the lowered configuration and the horizontal configuration. The elevation assistance range may be between 10 degrees and 60 degrees inclusive, between 15 degrees and 45 degrees inclusive, or between 15 degrees to 30 degrees inclusive.

In various embodiments of the disclosure, the towed vehicle comprises a stop assembly coupled to the actuation shaft and a stop bracket positioned for engagement of the stop assembly when the tow bar assembly is at an elevation angle that is below the equilibrium angle, the stop bracket being suspended from at least one flexible suspension member connected to the chassis. A load assembly includes the pivot connector, the elastic support, and the support bracket. In some embodiments, when the stop assembly engages the stop bracket and deflects the at least one flexible suspension member, an axial deflection of the at least one flexible suspension member is greater than an axial deflection of the load assembly. A ratio of the axial deflection of the at least one flexible suspension member to the axial deflection of the load assembly may be in a range of 10:9 to 2:1 inclusive, or in a range of 5:4 to 3:2 inclusive.

In some embodiments, application of a downward force of less than 30 pounds force on the tow bar assembly lowers the elevation angle below the equilibrium angle from 10 degrees to 20 degrees inclusive. In some embodiments, the actuation shaft is coupled to a brake system. The brake system may be actuated by the tow bar assembly.

In various embodiments of the disclosure, a method for retrofitting a towed vehicle with a lift assist system is disclosed, comprising: providing a kit including a support bracket and at least one elastic support; and providing installation instructions on a tangible, non-transitory medium, the installation instructions including: routing an actuation shaft through the support bracket; mounting the support bracket to a chassis of the towed vehicle; coupling the at least one elastic support to the actuation shaft for registration against the support bracket; and coupling the actuation shaft to a tow bar assembly of the towed vehicle, wherein the at least one elastic support generates an upward moment about a rotation axis of the tow bar that suspends a free end of the tow bar at an equilibrium height above a ground plane of the towed vehicle.

The kit provided in the step of providing a kit may include the actuation shaft and/or the pivot connector. The installation instructions provided in the step of providing installation instructions may include routing a brake system actuation shaft for the step of routing the actuation shaft. In some embodiments the installation instructions provided in the step of providing installation instructions include: selectively positioning a pivot connector axially along the actuation shaft for adjustment of the equilibrium height; and connecting the pivot connector to the tow bar for the step of coupling the actuation shaft. The installation instructions provided in the step of providing installation instructions may include threading the pivot connector along a length of an external thread at a forward end of the actuation shaft for the step of selectively positioning the pivot connector axially along the actuation shaft, and may include forming or extending the length of the external thread at the forward end of the actuation shaft.

In some embodiments, the kit provided in the step of providing a kit includes a stop bracket and a stop assembly, and the installation instructions provided in the step of providing installation instructions include: routing an actuation shaft through the stop bracket; mounting the stop bracket to a chassis of the towed vehicle; and securing the stop assembly to the actuation shaft for coupling with the stop bracket when the free end of the tow bar assembly breaches the equilibrium height. The kit provided in the step of providing a kit may include a stop cushion, and the installation instructions provided in the step of providing installation instructions may include disposing the stop cushion to contact the stop bracket when the free end of the tow bar assembly breaches the equilibrium height. In some embodiments, the kit provided in the step of providing a kit includes one or more axial spacers, and the installation instructions provided in the step of providing installation instructions may include coupling the at least one axial spacer to the at least one elastic support for increasing the equilibrium height. The support bracket is may be mounted within or beneath the chassis. In some embodiments, the method comprises executing the installation instructions.

BRIEF DESCRIPTION OF THE DRAWINGS

FIG. 28 is a flow diagram for a method of installing a lift assist system according to an embodiment of the disclosure.

DETAILED DESCRIPTION

Figure 1:
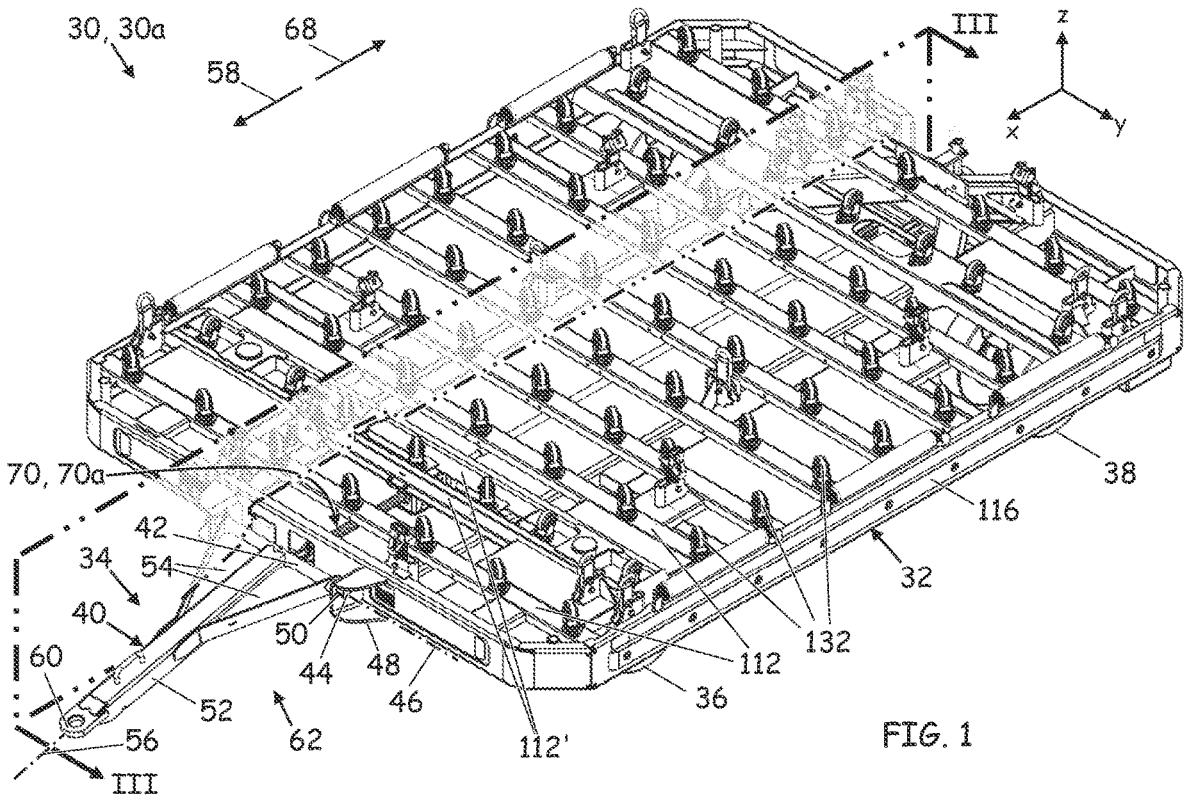
FIG. 1 is an upper perspective view of a towed vehicle equipped with a lift assist system and a tow bar assembly in a lowered configuration and utilizing a single compression spring column as an elastic support according to an embodiment of the disclosure.

Referring to FIGS. 1 through 5, a towed vehicle 30 is depicted according to an embodiment of the disclosure. The towed vehicle 30 includes a chassis 32 coupled to a tow bar assembly 34 and supported by front and rear tires 36 and 38. The lower extremities of the tires 36 and 38 define and are coplanar with a ground plane 39. The tow bar assembly 34 includes a tow bar 40 with a cross member 42. The cross member 42 may be a hollow tube supported by one or more pivot pins 44. The pivot pin(s) 44 define and are concentric about a rotation axis 46. In some embodiments, the pivot pin(s) 44 are supported by cantilevers 48 that extend from the chassis 32. Mounting collars 50 may be affixed to the cantilevers 48 for retention of the pivot pin(s) 44 within cross member 42.

The tow bar 40 may include a tongue 52 and gusset plates 54 that extend from the tongue 52 to the cross member 42. The tongue 52 defines a tongue axis 56 and extends in a forward direction 58 from the rotation axis 46 to a free end 60 of the tow bar 40. An elevation angle θ of the tow bar 40 is defined between the tongue axis 56 and a reference plane 66 that is coplanar with the rotation axis 46 and parallel to the ground plane 39. Negative values of the elevation angle θ indicates a condition where the free end 60 is below the reference plane 66 (e.g., FIG. 3).

Figure 2:
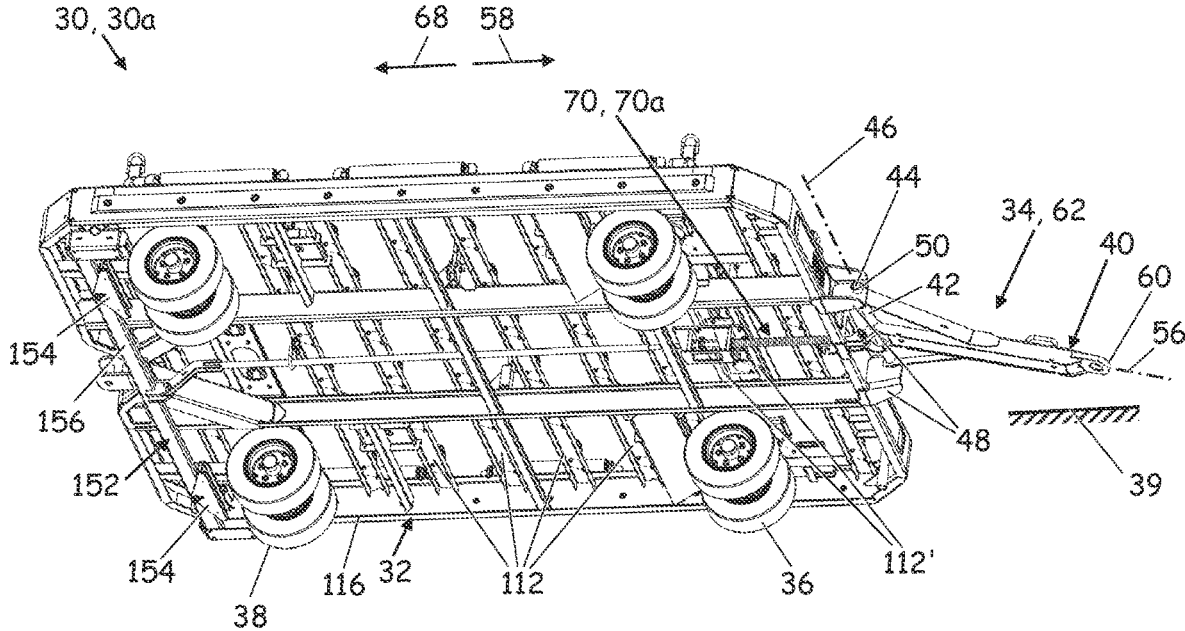
FIG. 2 is a lower perspective view of the towed vehicle of FIG. 1 according to an embodiment of the disclosure.
Figure 3:
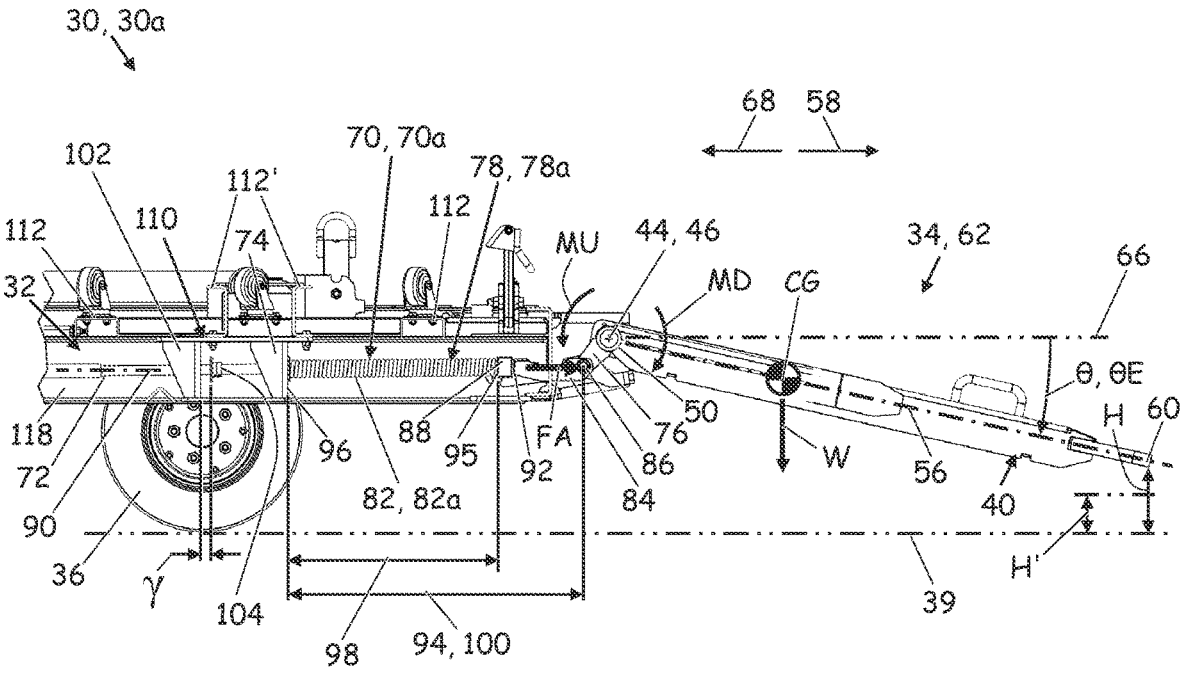
FIG. 3 is a partial sectional view at plane III-III of FIG. 1 according to an embodiment of the disclosure.
Figure 4:
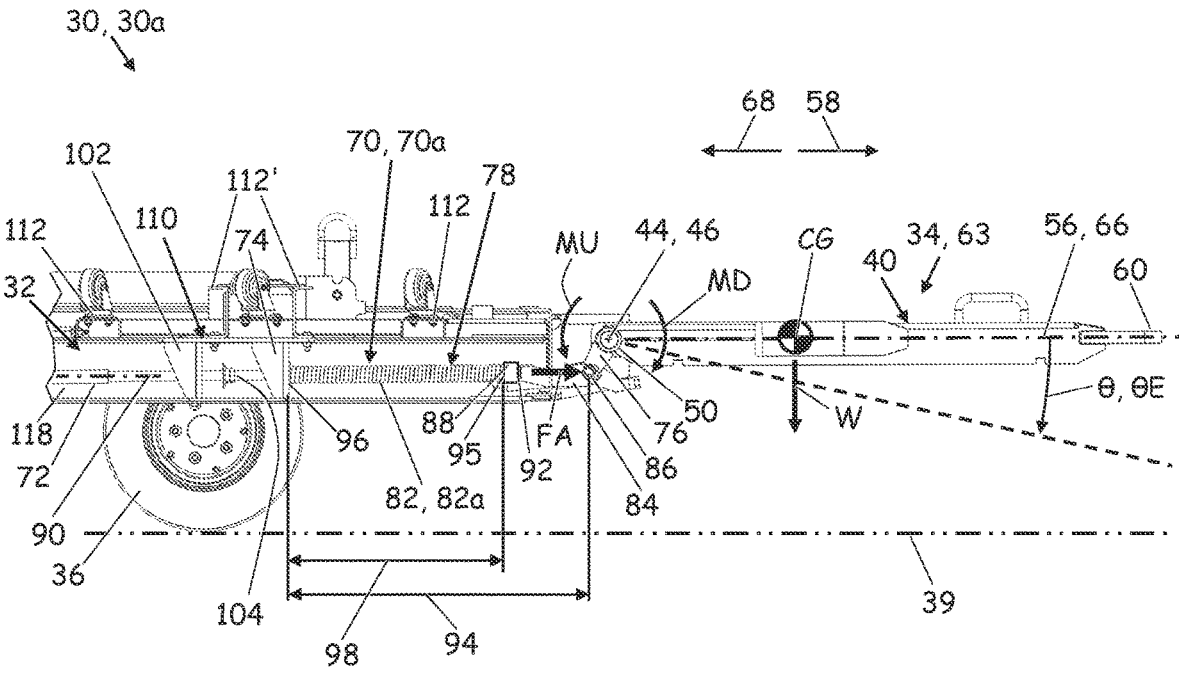
FIG. 4 is a partial sectional view at plane III-III of FIG. 1 with the tow bar assembly in a horizontal configuration according to an embodiment of the disclosure.
Figure 5:
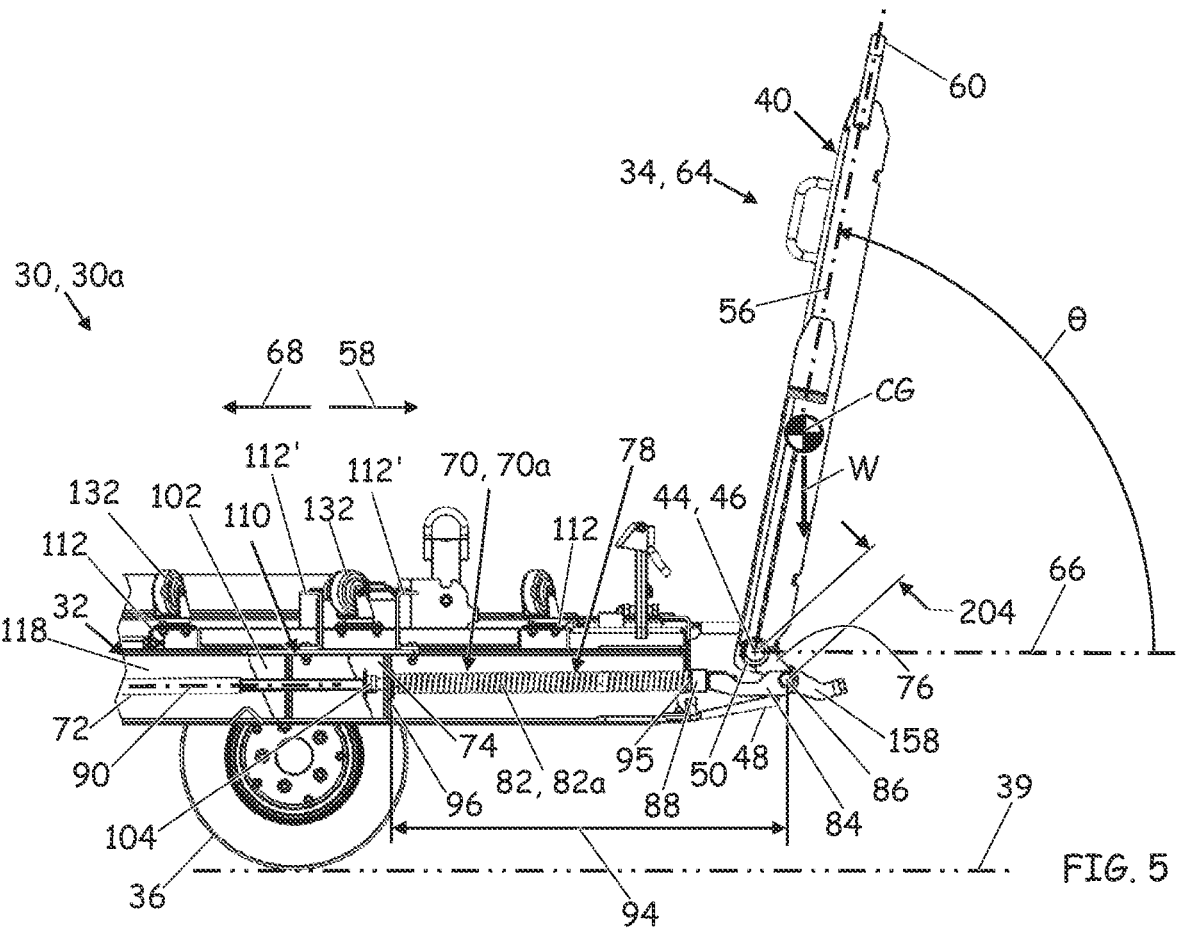
FIG. 5 is a partial sectional view at plane III-III of FIG. 1 with the tow bar assembly in a raised configuration according to an embodiment of the disclosure.

The tow bar assembly 34 has a weight distribution that may be characterized as a weight W located at a center of gravity CG along the tongue axis 56 and generating a downward moment MD about the rotation axis 46. In FIGS. 1 through 3, the towed vehicle 30 is depicted with the tow bar 40 in a lowered configuration 62. In FIG. 4, the towed vehicle 30 is depicted with the tow bar axis 56 coplanar with the reference plane 66, herein referred to as a horizontal configuration 63. In FIG. 5, the towed vehicle 30 is depicted with the tow bar 40 in a raised configuration 64.

The towed vehicle 30 also includes a lift assist system 70, 70a that extends into the chassis 32 in a rearward direction 68 from the tow bar assembly 34. Herein, various lift assist systems 70 are disclosed and depicted, referred to collectively or generically by reference character 70 and individually by reference character 70 followed by a letter suffix (e.g., lift assist systems 70a of FIGS. 1-5 and 70b of FIG. 22).

Figure 6:
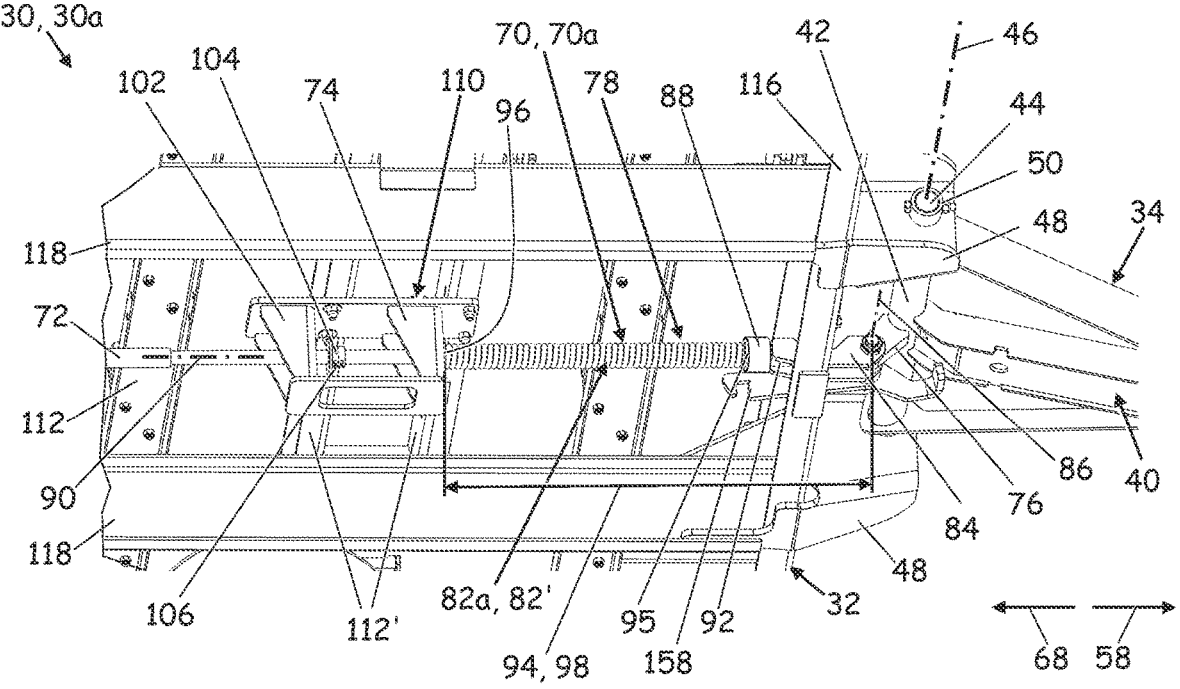
FIG. 6 is a partial lower perspective view of the towed vehicle of FIG. 1 according to an embodiment of the disclosure.
Figure 7:
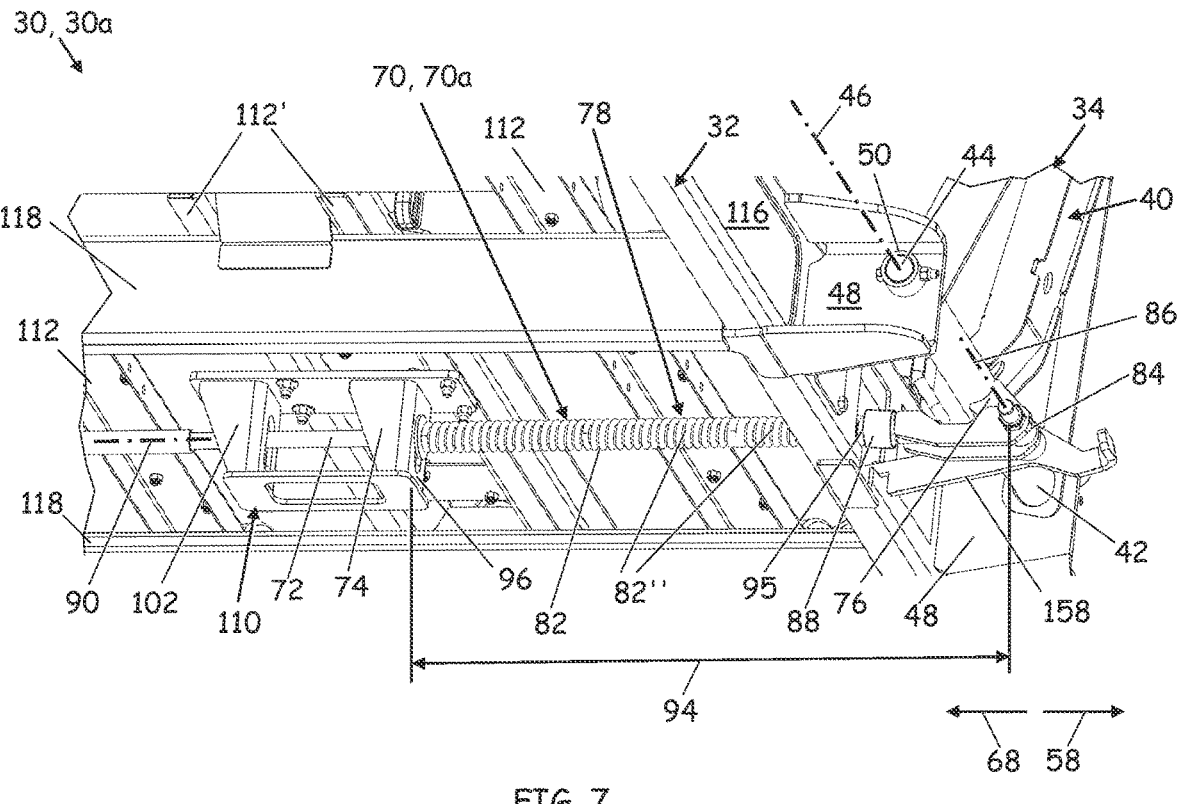
FIG. 7 is a partial lower perspective view of the towed vehicle of FIG. 1 with the tow bar assembly in a raised configuration according to an embodiment of the disclosure.

Referring to FIGS. 6 and 7 and again to FIGS. 3 through 5, the lift assist system 70a is depicted in greater detail according to an embodiment of the disclosure. The lift assist system 70a includes an actuation shaft 72, a support bracket 74, a linkage arm 76, and an elastic support 82 that cooperate to capture and actuate a load assembly 78. The load assembly 78 comprises the components that generate force to provide the lift assist function. For the lift assist system 70a, the elastic support 82 is a single compression spring column 82a of one or more compression springs. Accordingly, for the lift assist system 70a, a load assembly 78a includes the single compression spring column 82a, a pivot connector 84 defining a laterally extending pivot axis 86, and the support bracket 74. In some embodiments, the load assembly 78, 78a includes one or more axial spacers 88.

The actuation shaft 72 defines and is collinear with an actuation axis 90. The linkage arm 76 extends radially outward from the rotation axis 46 of the tow bar assembly 34 to the pivot connector 84 to which a forward end 92 of the actuation shaft 72 is coupled via the pivot connector 84. A displaced length 98 is the length of the elastic support 82, 82a at a given actuation length 94, the displaced length being defined by forward and rearward registration surfaces 95 and 96. An actuation length 94 of the load assembly 78a is defined as a distance from the rearward registration surface 96 of the support bracket 74 to the pivot axis 86 of the pivot connector 84. In the depicted embodiment, the forward registration surface 95 is defined by the axial spacer 88. In the absence of the axial spacer 88, the forward registration surface 95 may be defined by the pivot connector 84.

In operation, as the tow bar assembly 34 is rotated about the rotation axis 46, the location of the pivot connector 84 is translated axially to vary the actuation length 94 of the load assembly 78, 78a which in turn varies the displaced length 98 of the elastic support 82, 82a. Accordingly, a corresponding assistance force FA generated by the elastic support 82, 82a varies with the angular orientation of the tow bar 40 as the tow bar assembly 34 is rotated about the rotation axis 46. The assistance force FA generates an upward moment MU about the rotation axis 46 that acts against the downward moment MD generated by the weight W of the tow bar assembly 34. In some embodiments, the upward moment MU reaches an equilibrium with the downward moment MD when the free end 60 of the tow bar 40 is suspended above the ground plane 39. For such embodiments, when the tow bar assembly 34 is in the lowered configuration 62, the actuation length 94 of the load assembly 78, 78a defines an equilibrium length 100, and the suspension of the free end 60 above the ground plane 39 defines an equilibrium height H at an equilibrium elevation angle θE.

Figure 13:
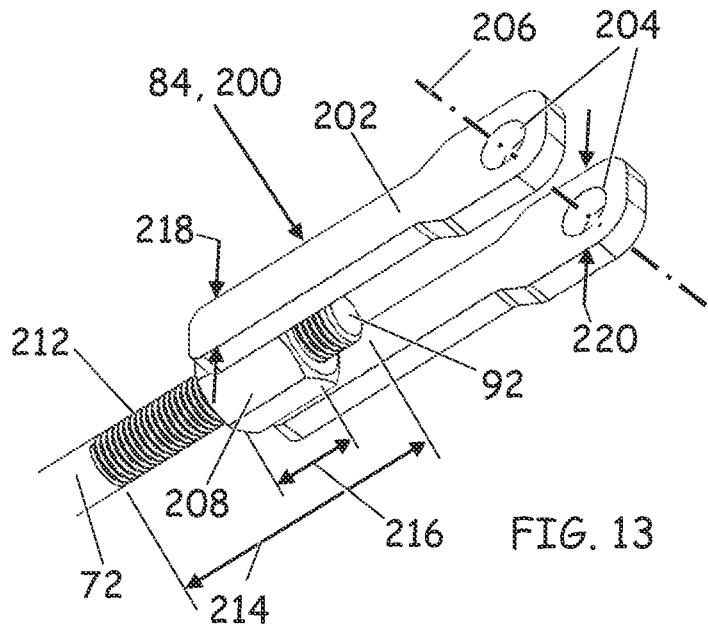
FIG. 13 is an enlarged, perspective view of a yoke assembly mounted to an actuation shaft of the towed vehicle of FIG. 1 according to an embodiment of the disclosure.
Figure 14:
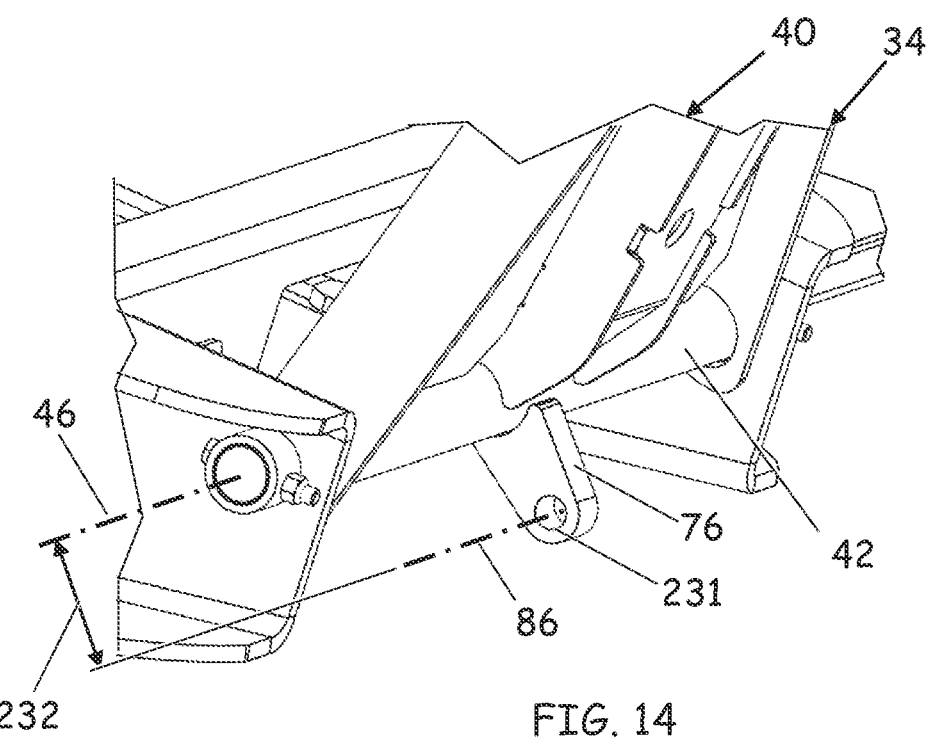
FIG. 14 is a partial perspective view of the tow bar assembly of FIG. 1 with the lift assist system removed according to an embodiment of the disclosure.

The lift assist system 70, 70a may be configured to selectively adjust the equilibrium height H of the lowered configuration 62. The equilibrium height H is affected, for example, by the spring rate of the elastic support 82, 82a. The length and spring rate of the elastic support 82, 82a may be chosen to provide a baseline for the equilibrium height H. The axial spacer(s) 88 may be used in the load assembly 78, 78a for increased displacement of the elastic support 82 at a given elevation angle θ. The increased displacement has the effect of causing the upward moment MU of the load assembly 78, 78a to reach equilibrium with the downward moment MD of the tow bar assembly 34 at a longer equilibrium length 100, which increases the equilibrium height H above the ground plane 39 relative to the baseline. In some embodiments, an axial position of the pivot connector 84 can be adjusted along the actuation shaft 72 to increase or decrease the equilibrium length 100 and equilibrium height H. (See, e.g., FIG. 13 and attendant discussion.) In some embodiments, the lift assist system 70, 70a can be adjusted using these techniques for the equilibrium height H in a range of zero to 60 centimeters inclusive. In some embodiments, the equilibrium height H is set in a range of 15 to 50 centimeters inclusive, which is near the typical height for hitching the towed vehicle 30 for towing. Herein, a range that is said to be "inclusive" includes the end point values of the stated range.

In some embodiments, the lift assist system 70, 70a includes a stop bracket 102. The stop bracket 102 engages the actuation shaft 72, for example via a stop assembly 104. The stop assembly 104 may be adjustable relative to the actuation shaft 72, for example with a set screw 106. In some embodiments, a cushion 108 (FIG. 11) positioned between the stop assembly 104 and the stop bracket 102. The stop bracket 102 and support bracket 74 may be part of an integrated bracket assembly 110.

The stop assembly 104 is coupled to the actuation shaft 72 and offset from the stop bracket 102 to define a gap γ in the lowered configuration 62. The gap γ may be defined from the stop assembly 104 to the stop bracket 102 (depicted) or, in embodiments so equipped, from the cushion 108 to the stop bracket 102. Under normal operation, contact between the stop assembly and the stop bracket 102 does not occur.

The gap γ enables the free end 60 of the tow bar 40 arc, at least momentarily, below the equilibrium height H to a secondary height above the ground plane 39. An example of when a secondary height occurs is when a downward momentum of the tow bar assembly 34 is released from an elevation angle θ that is above the lowered configuration 62. The gap γ enables a minimum secondary height H' above the ground plane 39 to be attained before the stop assembly 104 engages the stop bracket 102. That is, the gap γ enables some breaching of the equilibrium height H in normal operation.

A "contingency coupling" occurs when the gap γ is closed and the stop assembly 104 engages the stop bracket 102. Examples of when contingency coupling occurs include during a forced grounding of the tow bar 40 or when the momentum of a released tow bar assembly 34 would otherwise breach the minimum secondary height H'.

In some embodiments, the chassis 32 is designed to impart a degree of flexibility to the function of the stop bracket 102. The chassis 32, which includes lateral cross members 112 and an outer frame 116 supported by stringers 118, may include one or more flexible suspension members 112' to which the support bracket 74 and stop bracket 102 are mounted. In the depicted embodiment, the one or more flexible suspension members 112' are a pair to which deck casters 132 and the front tires 36 are mounted.

Figure 10:
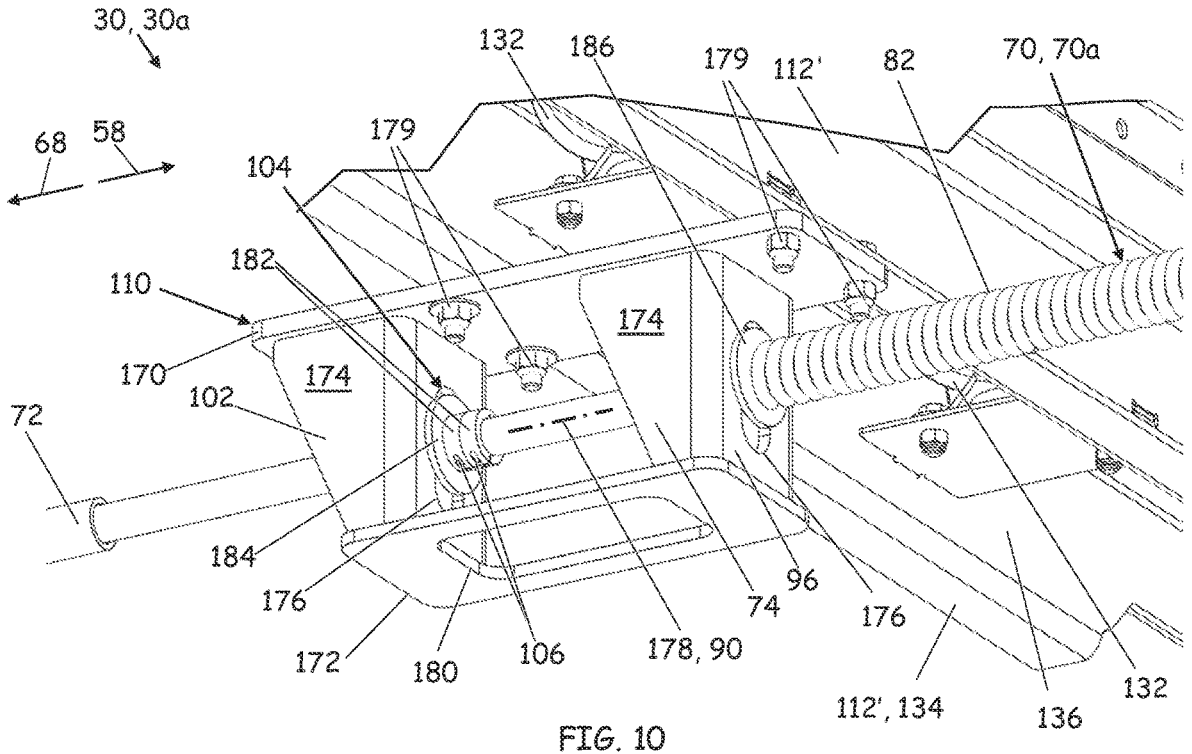
FIG. 10 is an enlarged view of an installed integrated bracket assembly of FIG. 1 with a stop assembly coupled to a stop bracket according to an embodiment of the disclosure.
Figure 11:
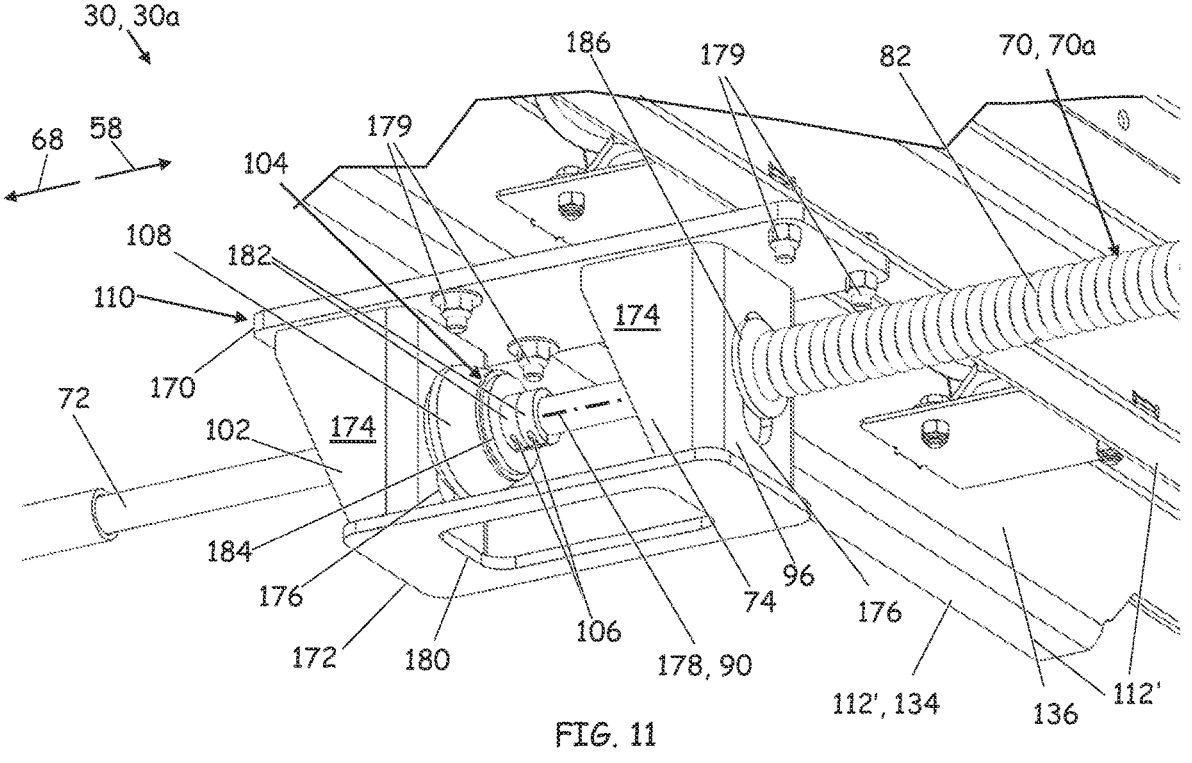
FIG. 11 is an enlarged view of an installed integrated bracket assembly of FIG. 1 with a cushion coupled to a stop bracket according to an embodiment of the disclosure.

In some embodiments, the flexible suspension member(s) 112' are channel beams 134 having a web 136 oriented vertically (FIGS. 10 and 11). The span of the flexible suspension member(s) 112' enables rearward deflection, for example during a forced grounding, without structural damage or plastic deformation. In some embodiments, the flexible suspension member(s) 112' are affixed to the chassis 32 only at or laterally proximate to the outer frame 116, such that the flexible suspension member(s) 112' are axially unrestrained by the stringers 118 and free to slide on the stringers 118 in the forward and rearward directions 58 and 68. Also, during a forced grounding, the flexible suspension member(s) 112' deflect in the rearward direction 68 by sliding along the stringers 118. Alternatively, the suspension member(s) 112' are affixed to the stringers 118 to define the span therebetween. In the depicted embodiment, where the flexible suspension member(s) 112' support deck casters 132, the deck casters 132 are able to roll on the underside of any load (e.g., container), enabling deflection of the flexible suspension member(s) 112'. Likewise, for embodiments wherein the front tires 36 are affixed to the flexible suspension member(s) 112', the front tires 36 can roll in response to the deflection of the flexible suspension member(s) 112'. The cumulative effect of some or all of these aspects is an enhanced flexibility of the flexible suspension member(s) 112' in the forward and rearward directions 58 and 68.

Figures 8A, 8B, 8C:
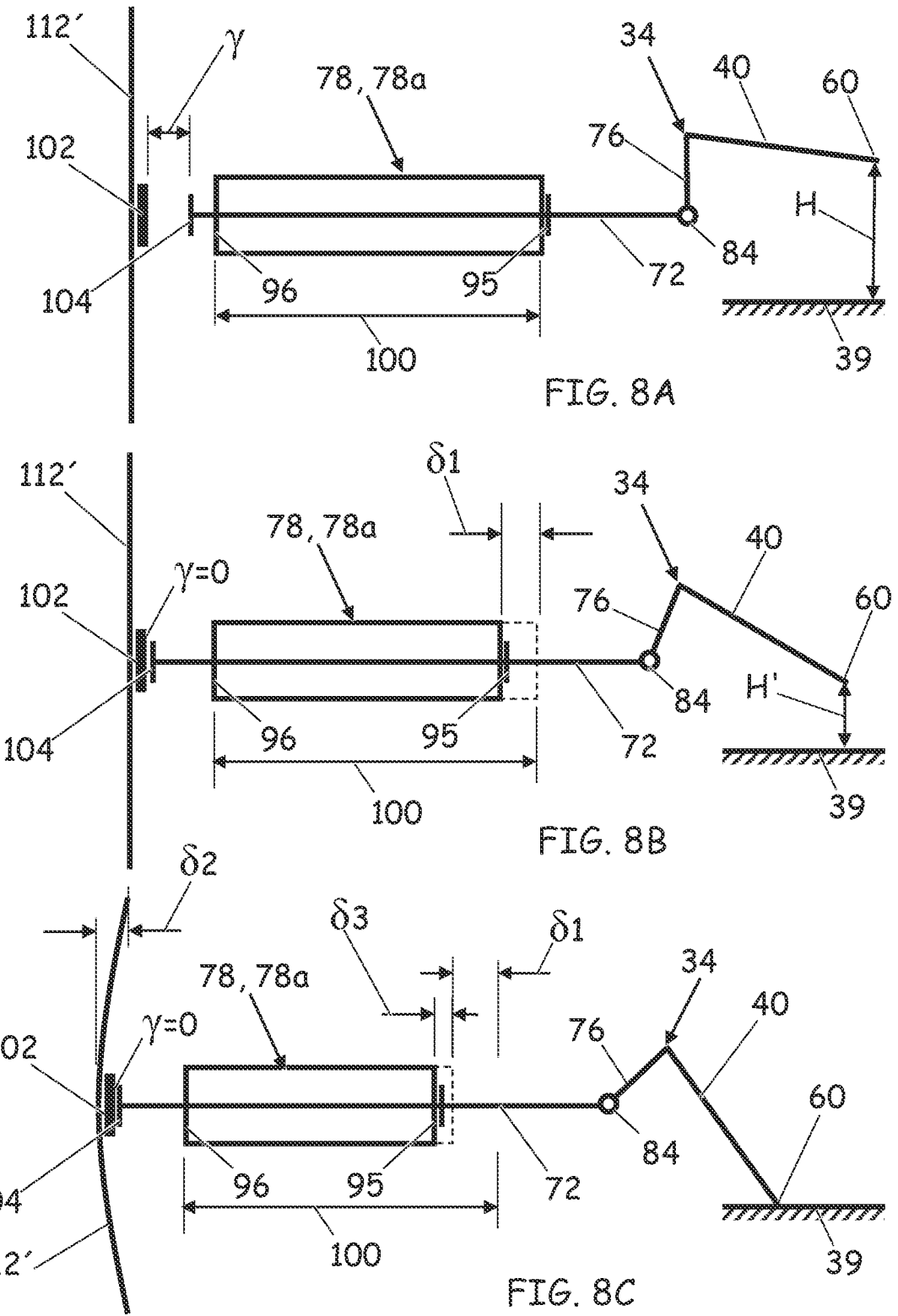
FIGS. 8A through 8C are schematic diagrams depicting operation of a flexible suspension system according to an embodiment of the disclosure.

Referring to FIGS. 8A through 8C, the effect of the flexible suspension members 112' is schematically depicted according to an embodiment of the disclosure. When the actuation shaft 72 is at the lowered configuration 62, the gap γ is defined between the stop assembly 104 and the stop bracket 102 (FIG. 8A) and the load assembly 78, 78a is at an equilibrium length 100 to define an equilibrium height H. When the equilibrium height H is breached so that the free end 60 of the tow bar 40 reaches the minimum secondary height H', the stop assembly 104 engages the stop bracket 102 (FIG. 8B). The load assembly 78, 78a absorbs substantially all of an axial deflection 61 as the gap γ is closed (i.e., to γ=0). In the event of a forced grounding, the translation of the actuation shaft 72 and stop assembly 104, now engaged with the stop bracket 102, causes an axial deflection 62 of the flexible suspension members 112' (FIG. 8C). The load assembly 78, 78a also experiences an additional deflection 63. The additional deflection 63 is less than the axial deflection 62 of the flexible suspension members 112' because when the stop assembly 104 engages the stop bracket 102 load assembly 78, 78a is stiffer than the flexible suspension members 112'.

Accordingly, the excessive forces experienced during a forced grounding are largely absorbed by the flexible suspension members 112' rather than the components of the load assembly 78, 78a. The flexible suspension member(s) 112' enable embodiments where the cushion 108 is eliminated from the lift assist system 70, 70a so that the stop assembly 104 is in direct contact with the stop bracket 102 during a forced grounding or when the minimum secondary height H' is otherwise breached. In some embodiments, a ratio of the axial deflection 62 of the flexible suspension members 112' to the additional deflection 63 of the load assembly 78, 78a (62:63) is in a range of 10:9 to 2:1 inclusive. In some embodiments, the 62:63 ratio is in a range of 5:4 to 3:2 inclusive.

Functionally, the lift assist system 70, 70a substantially reduces the fraction of the weight W of the tow bar assembly 34 that must be overcome by operating personnel to rotate the tow bar 40 upward. When the tow bar assembly 34 is at or near the lowered configuration 62, the assistance force FA exerted on the tow bar assembly 34 by lift assist system 70, 70a generates an upward moment MU about the rotation axis 46 that counters the downward moment MD generated by the weight W of the tow bar assembly 34. As such, the exertion force required by an operator to rotate the tow bar 40 upwards through the horizontal orientation is reduced.

Configuring the lift assist system 70, 70a for the equilibrium height H above the ground plane can act as a guard against injury to personnel during in the event of an unintentional release of the tow bar assembly 34. For example, if an operator loses grip on the tow bar 40 during handling or the tow bar 40 becomes detached from a towing vehicle without operator attention, the lift assist system 70, 70a may prevent the free end 60 of the tow bar 40 from reaching the ground plane 39, thereby also preventing injury to the operator due to bodily extremities that could otherwise be crushed between the free end 60 and the ground.

In some embodiments, the stop bracket 102 provides an added measure of safety against operator injury. Consider a scenario where the downward momentum of the released tow bar assembly 34 causes the elastic support 82, 82a to be deformed, at least momentarily, beyond limits that establish the equilibrium length 100 of the lowered configuration 62. In this scenario, the equilibrium height H could be breached so that the free end 60 of the tow bar 40 reaches or nearly reaches the ground plane 39. Such a breach could cause impact with and injury to personnel. The stop bracket 102, in conjunction with the stop assembly 104, can effectively prevent the downward momentum of the released tow bar assembly 34 beyond the equilibrium length 100 of the lowered configuration 62. The stop assembly 104 and, when implemented, the cushion 108 acting against the stop bracket 102 can provide substantially stiffer resistance to continued rearward travel of the actuation shaft 72 than the excessively deformed elastic support 82, 82a, thereby arresting the downward momentum of the falling tow bar assembly 34 before the breach of the equilibrium height H becomes problematic.

In some embodiments, the gap γ is set to effect the secondary height H' that provides an additional safeguard against personnel injury. For example, the secondary height H' may be set in a range of 5 to 15 centimeters inclusive for additional protection of operator extremities such as toes and feet. Arresting the rearward translation of the actuation shaft 72 can also prevent damage to various components (e.g., the elastic support 82, 82a) of the lift assist system 70, 70a due to excessive deformation.

Setting the gap γ to a non-zero value enables the towbar to be adjusted bidirectionally. That is, for a non-zero gap γ, an operator may urge the tow bar downward from the equilibrium height H, for example during connection to a towing vehicle, without encountering substantial resistance until the stop assembly 104 or cushion 108 contacts the stop bracket 102. Accordingly, the operator may adjust the height of the tow bar above or below the equilibrium height H in normal operation.

The flexible suspension member(s) 112' can provide damage mitigation to the lift assist system 70, 70a. Consider a scenario where the tow bar assembly 34 is forcibly rotated to or through the ground plane 39, for example when a vehicle accidentally rolls over the tow bar 40. Engagement of the stop assembly 104 or cushion 108 with the stop bracket 102 may generally protect the elastic support 82, 82a from excessive deformation, but other damages may occur, such as buckling or lateral deformation of the actuation shaft 72 or structural damage to the pivot connector 84, linkage arm 76, stop assembly 104, cushion 108, and stop bracket 102, as well as the various fasteners and threaded components that assemble the lift assist system 70, 70a. The flexible suspension member(s) 112' protects the lift assist system 70, 70a from these maladies.

Extending the lift assist system 70, 70a rearward of the tow bar assembly 34 substantially maintains the profile of the tow bar 40 without need for extraneous structure that may interfere with normal operation. Disposing the lift assist system 70, 70a within the chassis 32 provides general protection against damage, for example caused by collisions with low clearance obstacles that may be encountered in use. In some embodiments, passage of the actuation shaft 72 through the support bracket 74 and/or stop bracket 102 supports and suspends the rearward routing of the actuation shaft 72 within the chassis 32.

Referring to FIG. 9 and again to FIG. 2, the lift assist system 70, 70a may be integrated with a brake assembly 152 according to embodiments of the disclosure. The brake assembly 152 that is actuated by the tow bar assembly 34 and actuation shaft 72. The brake assembly 152 generally includes brake bars 154 that are coupled to a structure that, when subject to a forward force vector, causes the brake bars 154 to engage the rear tires 38 (depicted) or front tires 36. The structure may be a sliding cross member 156 (depicted), such as disclosed at U.S. Provisional Patent Application No. 62/660,339 to Hoeper et al., filed Apr. 20, 2018, as well as U.S. patent application Ser. No. 17/960,601 to Venem, filed Oct. 5, 2022, both of which are assigned to the owner of the present application. Other structures include rotating brake assemblies, such as disclosed by U.S. Pat. No. 9,744,955 to Hoeper et al., filed Jan. 19, 2016, also assigned to the owner of the present application.

Figure 9:
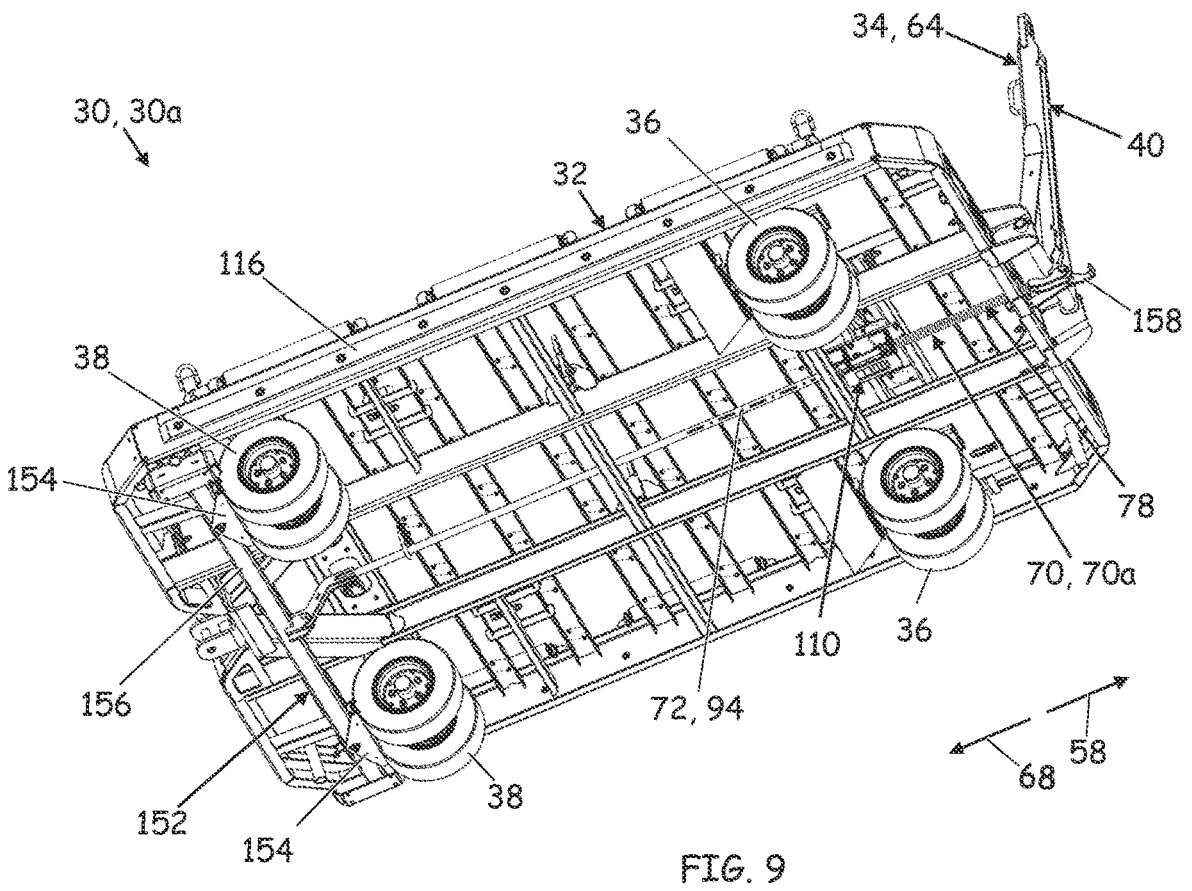
FIG. 9 is a lower perspective view of the towed vehicle of FIG. 1 with the tow bar assembly in a raised configuration according to an embodiment of the disclosure.

The actuation shaft 72 may extend in the rearward direction 68 for coupling with and forward actuation of the brake assembly 152. When the tow bar assembly 34 is at or near the lowered configuration 62, the actuation shaft 72 applies a rearward force on the brake assembly 152 so that the brake bars 154 are disengaged from the rear tires 38 (FIG. 2). When the tow bar assembly 34 is in the raised configuration 64, the actuation shaft 72 applies a forward force on the brake assembly 152 so that the brake bars 154 are engaged with the rear tires 38 (FIG. 9). In some embodiments, the brake assembly 152 is maintained in contact with the rear tires 38 (or alternatively front tires 36) by a latch hook 158 that passively couples the tow bar assembly 34 to the chassis 32 (best seen in FIG. 12) to secure the tow bar assembly 34 in the raised configuration 64.

Accordingly, the lift assist system 70, 70a and the brake assembly 152 operate primarily near different extremes of the rotational range of the tow bar assembly 34. That is, at or near the lowered configuration 62, where the brake assembly 152 is disengaged, the lift assist system 70, 70a operates to provide the greatest degree of lifting assistance to the operator; at or near the raised configuration 64, where the brake assembly 152 is engaged with the rear tires 38, the lift assist system 70, 70a provides the least amount of lifting assistance to the operator. In some embodiments, the elastic support 82, 82a is configured for engagement with and exertion of force against the pivot connector 84 throughout the rotation range of the tow bar assembly 34. In other embodiments, the elastic support 82, 82a may disengage from the pivot connector 84 as the tow bar assembly 34 is lifted toward the raised configuration 64, thereby providing no lifting assistance at all as the brake assembly 152 is set. As such, the lift assist system 70, 70a and the brake assembly 152 are fully integrated with the tow bar assembly 34 and the actuation shaft 72 without interference of their respective operations.

Referring to FIGS. 10 and 11, the integrated bracket assembly 110 and components that interface therewith are depicted in greater detail according to an embodiment of the disclosure. The integrated bracket assembly 110 includes the support bracket 74 and the stop bracket 102, which are affixed to a common mounting plate 170 and a bracket spacer 172. The brackets 74 and 102 may include gussets 174 and may define through-apertures 176 that define and are concentric about a bracket axis 178. The through-apertures 176 may be vertically elongate. In assembly, the bracket axis 178 is in substantial lateral alignment with the actuation axis 90. The mounting plate 170 may be affixed to and depend from the flexible suspension members 112', for example with fasteners 179. In some embodiments, the bracket spacer 172 is a plate that defines an access 180.

The stop assembly 104 may include one or more shaft collars 182 that are affixed to the actuation shaft 72, for example by clamping the shaft collar(s) 182 onto the actuation shaft 72 with the set screws 106 extending tangentially about the actuation axis 90. In some embodiments, the stop assembly 104 includes a ring or washer 184 that contacts the stop bracket 102 (FIG. 10). The ring or washer 184 may be of greater diameter than the shaft collar(s) 182. Likewise, a ring or washer 186 may be disposed between the elastic support 82, 82a and the support bracket 74, which may be of greater diameter than the elastic support 82, 82a. The cushion 108, when implemented, is disposed between the collar assembly 104 and the stop bracket 102 (FIG. 11). The cushion 108 may be a bumper (depicted), spring, or other elastic structure.

Functionally, the through-apertures 176 enable passage of the actuation shaft 72 into or through the integrated bracket assembly 110. The vertically elongate geometry for the through-apertures 176 enables vertical displacement of the actuation shaft 72 throughout the full rotational range of the tow bar assembly 34 without interference from the integrated bracket assembly 110. The access 180 enables additional access to the stop assembly 104 for adjustment and tightening.

The use of more than one shaft collar 182 in axial contact with each other enhances the strength of the coupling of the stop assembly 104 to the actuation shaft 72. The ring or washer 186 of diameter greater than the shaft collar(s) 182 acts to spread contact forces with the cushion 108 over a larger area, and to help bridge a lateral width of the through-aperture 176 in embodiments where the stop assembly 104 is in direct contact with the stop bracket 102.

Referring to FIGS. 12 through 15A, the lift assembly 70, 70a, load assembly 78, 78a, and various components associated therewith are depicted in greater detail according to an embodiment of the disclosure. The pivot connector 84 may include a yoke assembly 200 for mounting to the actuation shaft 72 and for coupling to the linkage arm 76 of the tow bar assembly 34. The yoke assembly 200 includes a clevis 202 that defines through-apertures 204, the through-apertures 204 defining and being aligned along a lateral clevis axis 206. The clevis 202 is arranged to straddle the linkage arm 76 for pivotal coupling thereto. In some embodiments, the yoke assembly 200 includes a threaded connector 208 at the base of the clevis 202, the threaded connector 208 being configured to receive external threads 212 defined at the forward end 92 of the actuation shaft 72. The external threads 212 may be defined over an outer threaded length 214 at the forward end 92 that is longer than an inner threaded length 216 of the threaded connector 208. The clevis 202 may be of reduced dimension 218 at the threaded connector 208 and expand to a greater dimension 220 at the through-apertures 204.

Other ways of coupling the yoke assembly 200 along the actuation shaft 72 are contemplated, including with a pin (not depicted) that is set within one of a plurality of through holes (not depicted) defined by and spaced axially along the actuation shaft 72, or with a clamp (not depicted) that is used instead of the threaded connector 208. The linkage arm 76 defines a pivot aperture 231 that defines and is concentric about the pivot axis 86 for coupling with the yoke assembly 200. A working length 232 of the linkage arm 76 is defined from the rotation axis 46 of the tow bar assembly 34 to the pivot axis 86 (also depicted at FIG. 5).

Figure 15:
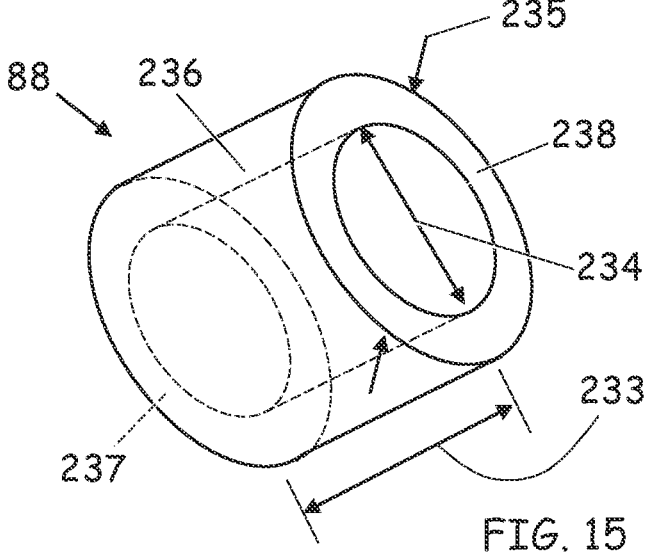
FIG. 15 is a perspective, isolated view of an axial spacer for the towed vehicle of FIG. 1 according to an embodiment of the disclosure.
Figure 15A:
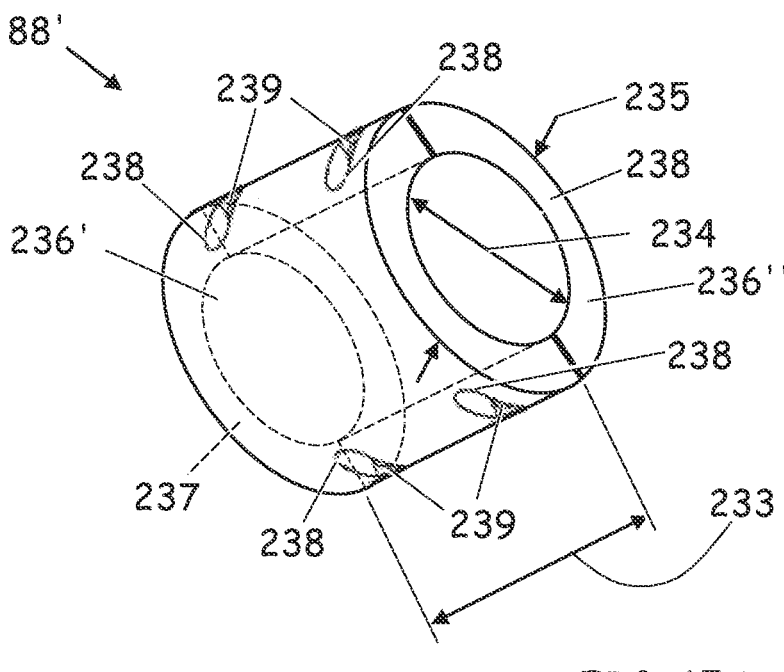
FIG. 15A is a perspective, isolated view of a bifurcated axial spacer for the towed vehicle of FIG. 1 according to an embodiment of the disclosure.

The axial spacer(s) 88 define an axial length 233, an inner dimension 234, and an outer dimension 235 that provides end surfaces 237 and 238 (FIG. 15) against which the elastic support 82, 82a and pivot connector 208 are registered. The inner dimension 234 may provide clearance for sliding over the actuation shaft 72. In some embodiments, the axial spacer 88 is a thick-walled hollow cylinder 236, which is non-limiting. A person of ordinary skill in the relevant arts will recognize that forms other than the thick-walled hollow cylinder 236 sharing the same characteristics may be used, for example a hollow tube with washers at one or both ends. In some embodiments, a bifurcated axial spacer 88' includes two half-cylinders 236' and 236" (FIG. 15A). The half-cylinders 236' and 236" define access pockets 238 and threaded tap holes that can be tangentially aligned to accept fasteners (not depicted) that couple the half-cylinders 236' and 236".

Figure 12:
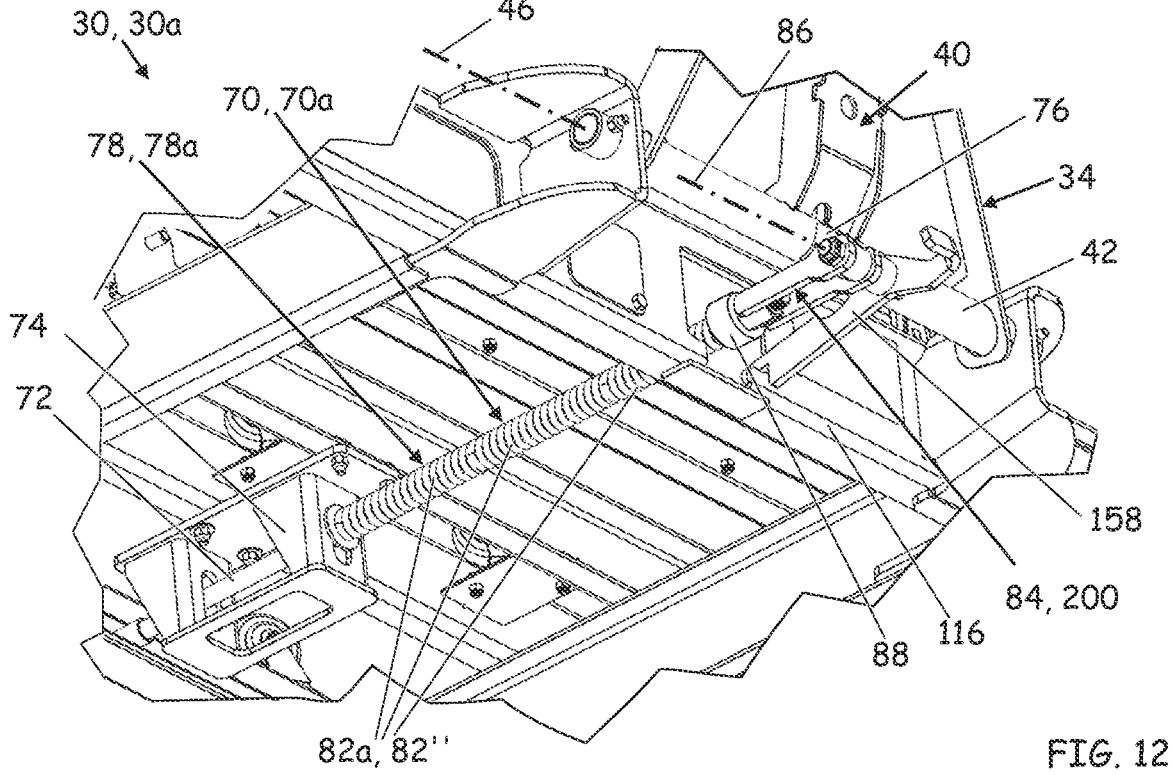
FIG. 12 is a partial lower perspective view of the towed vehicle of FIG. 1 with the tow bar assembly in a raised configuration according to an embodiment of the disclosure.

Functionally, the threaded connector 208 enables the yoke assembly 200 to be positioned along the outer threaded length 214 of the external threads 212 of the forward end 92 of the actuation shaft 72 for adjustment of the equilibrium length 100 and corresponding equilibrium height H. The reduced dimension 218 of the clevis 202 may, in some embodiments, enable passage of the yoke assembly 200 through the outer frame 116 of the chassis 32 and under the cross member 42 of the tow bar assembly 34 without undue interference, such as depicted at FIG. 12. The axial spacer(s) 88 may be slid over the actuation shaft 72 during buildup of the loaded assembly 78, 78a to effect a longer equilibrium length 100 and greater equilibrium height H. The length of the axial spacer 233 is approximately added to the equilibrium length 100. For the depicted embodiments, the axial spacer 88 is presented in contact and registration with the pivot connector 84. This aspect is non-limiting. That is, the axial spacer(s) 88 may be included at other locations within the loaded assembly 78, 78a, for example in registration with the support bracket 74 or between individual serial elastic supports 82" of a buildup of the elastic supports 82, 82a. In some embodiments, the axial spacers 88 may be flat rings or washers (not depicted) dimensioned to slide over the actuation shaft 72 and included during buildup of the load assembly 78, 78a.

Figures 16, 17, 18:
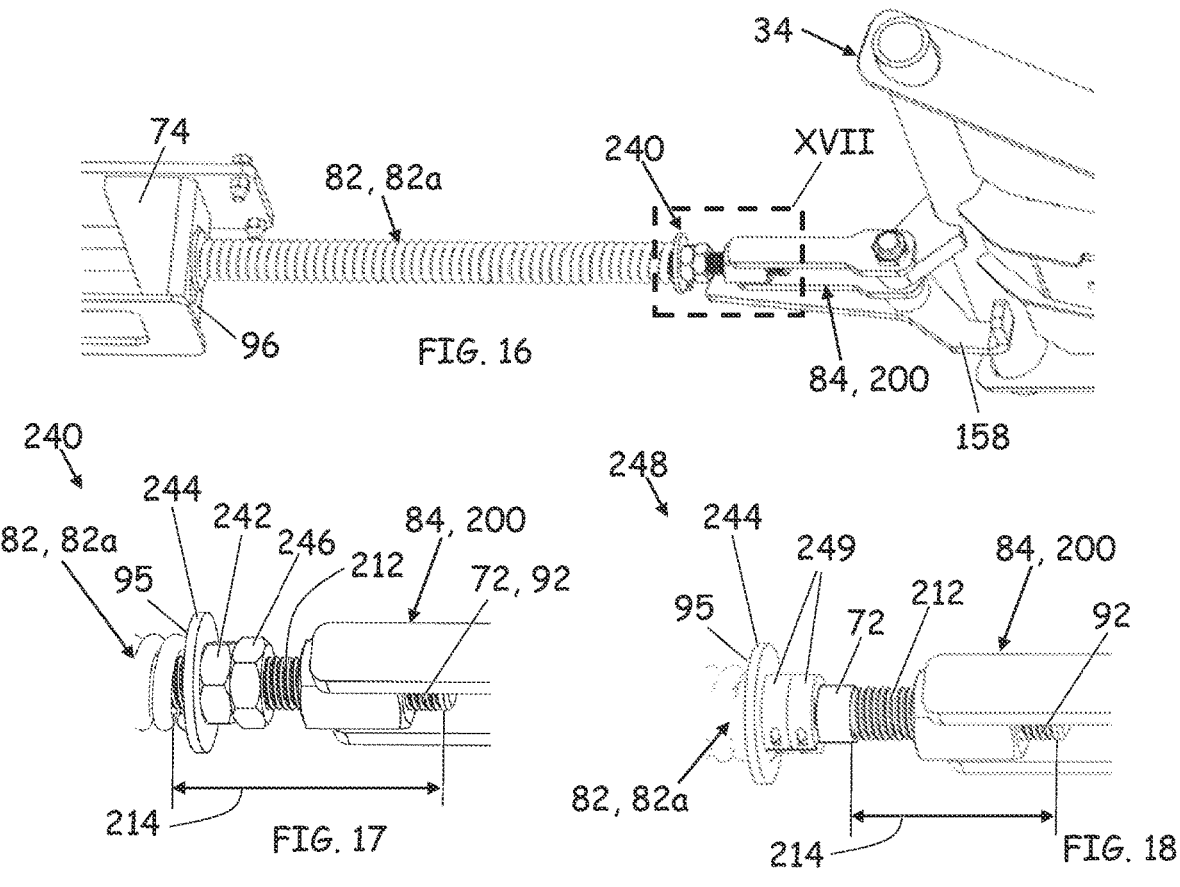
FIG. 16 is a lower perspective view of a lift assist system with an adjustment mechanism for varying an equilibrium length of a lift assist system according to an embodiment of the disclosure.
FIG. 17 is an enlarged view of the adjustment mechanism at inset XVII of FIG. 16 according to an embodiment of the disclosure.
FIG. 18 is an enlarged view of an alternative adjustment mechanism for FIG. 16 according to an embodiment of the disclosure.

Referring to FIGS. 16 through 18, an adjustable spacer assembly 240 is depicted according to an embodiment of the disclosure. In some embodiments, the adjustable spacer assembly includes an adjustment nut 242 that is coupled to the external threads 212 of the forward end 92 of the actuation shaft 72 to establish the forward registration surface 95 for the elastic support 82, 82a, for example with a washer 244 along the outer threaded length 214 of the external threads 212. Alternatively, instead of or in addition to the washer 244, the adjustment nut 242 may be used to adjust the axial location of the spacer(s) 88 to establish the forward registration surface 95 against the axial spacer 88. The position of the adjustment nut 242 may be set using a lock nut 246. In some embodiments, an adjustable spacer assembly 248 utilizes one or more shaft collars 249 instead of the adjustment nut 242 (FIG. 18).

Functionally, the adjustment nut 242 enables adjustment of the forward registration surface against a load that is imposed by the elastic support 82, 82a. The use of the shaft collars 248 may require pre-loading of the elastic support 82, 82a, but enables the axial location of the forward registration surface 95 to be set for embodiments where there are no external threads 212 or the desired location for the forward registration surface 95 is beyond the threaded length 214 (depicted).

Figure 19:
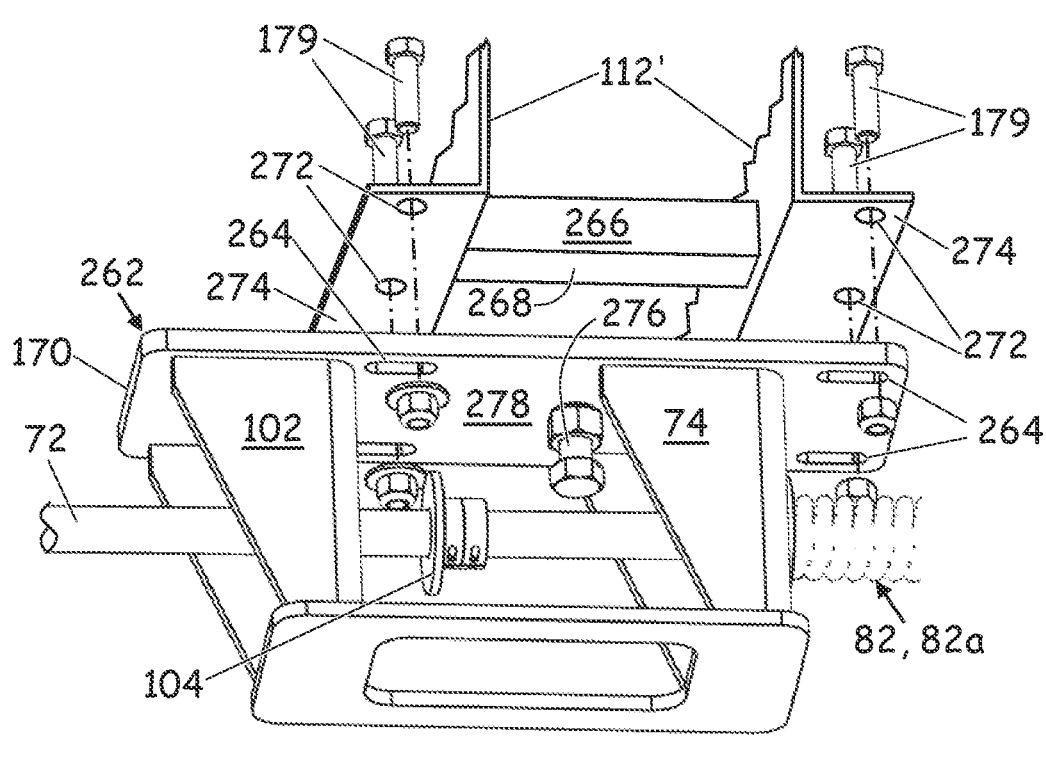
FIG. 19 is an exploded, lower perspective view of an adjustable bracket assembly according to an embodiment of the disclosure.
Figure 20:
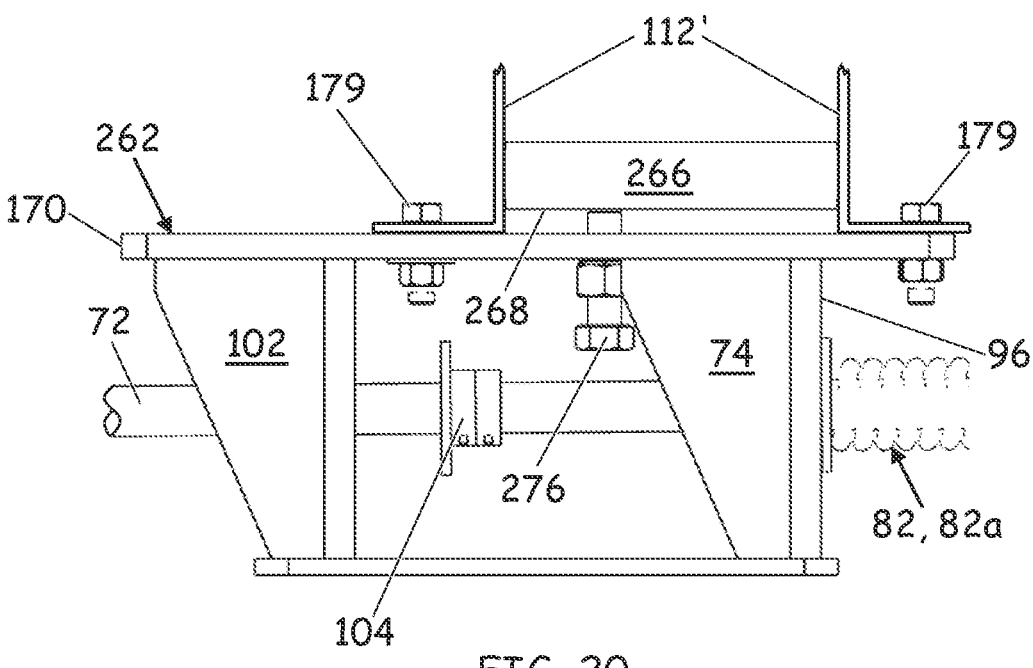
FIG. 20 is an assembled elevational view of the adjustable bracket assembly of FIG. 19 according to an embodiment of the disclosure.

Referring to FIGS. 19 and 20, an adjustable bracket 262 is depicted according to an embodiment of the disclosure. The adjustable bracket 262 may include some of the same components and attributes as the integrated bracket assembly 110, some of which are indicated by same-labeled reference characters. The adjustable bracket 262 defines elongate mounting apertures 264 that are axially elongate. In some embodiments, a brace 266 spans and is rigidly affixed to the flexible suspension members 112', for example by welding. The brace 266 may be aligned over the actuation axis 90 and includes a lower surface 268. The flexible suspension members 112' define through-apertures 272 that pass through mounting surfaces 274 of the flexible suspension members 112'. A set screw 276 is coupled to and threadably engaged with an underside 278 of the mounting plate 170, the set screw 276 being aligned with the lower surface 268 of the brace 266 when the adjustable bracket 262 is mounted to the flexible suspension members 112'.

In assembly, the fasteners 179 are routed through the through-apertures 272 and elongate mounting apertures 264 for loose coupling of the adjustable bracket 262 to the flexible suspension members 112'. The loose coupling of the adjustable bracket 262 may provide some friction between the mounting plate 170 and the mounting surfaces 274 of the flexible suspension members 112'. The adjustable bracket 262 is positioned axially by sliding the elongate mounting apertures 264 over the fasteners 179. In some embodiments, some or all of the fasteners 179 are drawn tight to secure the adjustable bracket 262 to the flexible suspension members 112'. For such embodiments, the adjustable bracket 262 need only define the elongate mounting apertures 264, so the set screw 276 may be omitted therefrom.

In some embodiments, after positioning of the adjustable bracket 262, the set screw 276 may be set against the lower surface 268 of the brace 266, which acts to bias the adjustable bracket 262 downward, applying a tension to the fasteners 179.

Functionally, varying an axial location of the adjustable bracket 262 changes the axial location of the rearward registration surface 96 of the support bracket 74, thereby shifting the equilibrium length 100 of the lift assist system 70, 70a. Moving the adjustable bracket 262 in the forward direction 58 shifts the equilibrium length forward; moving the adjustable bracket 262 in the rearward direction 68 shifts the equilibrium length rearward. Tightening of the set screw 276 against the lower surface 268 of the brace 266 and the attendant biasing against the fasteners 179 may be sufficient to secure the mounting plate 170 against the axial forces of operation encountered by the adjustable bracket 262. Otherwise, the fasteners 179 can also be tightened after the set screw 276 is set.

Changing or shifting the equilibrium length 100 of the lift assist system 70, 70a affects the range of elevation angles θ where assistance is provided. Increasing the equilibrium length 100 or shifting the equilibrium length 100 forward shifts the range of lift assistance to higher elevation angles; decreasing the equilibrium length 100 or shifting the equilibrium length rearward shifts the range to lower elevation angles. Installation of the spacer(s) 88, additional individual dampers 316 as well as adjustment of the pivot connector 84 along the outer threaded length 214 of the actuation shaft 72, requires disconnection of the tow bar assembly 34 from the actuation shaft 72 to implement. The bifurcated axial spacer 88', the adjustable spacer assembly 240, and the adjustable bracket assembly 262 enable adjustment of the equilibrium length 100 without need of detaching the pivot connector 84 from the tow bar assembly 34.

Non-limiting examples of elastic supports 82 include a coil spring (depicted), a leaf spring (FIG. 24), a gas shock (FIG. 23), dampers (FIG. 22), or combinations thereof. A spring rate of the elastic support 82 may be constant or variable. In some embodiments, the elastic support 82 is a single elastic support 82' (FIG. 6) or a plurality of elastic supports 82" in a serial arrangement (two depicted in FIG. 7 and three depicted in FIG. 12). The plurality of serial elastic supports 82" may be of differing spring rate, and may be constant, variable, or a combination thereof. The elastic supports 82 may act along the actuation length 94, or parallel but offset therefrom (e.g., FIG. 25).

Figure 21:
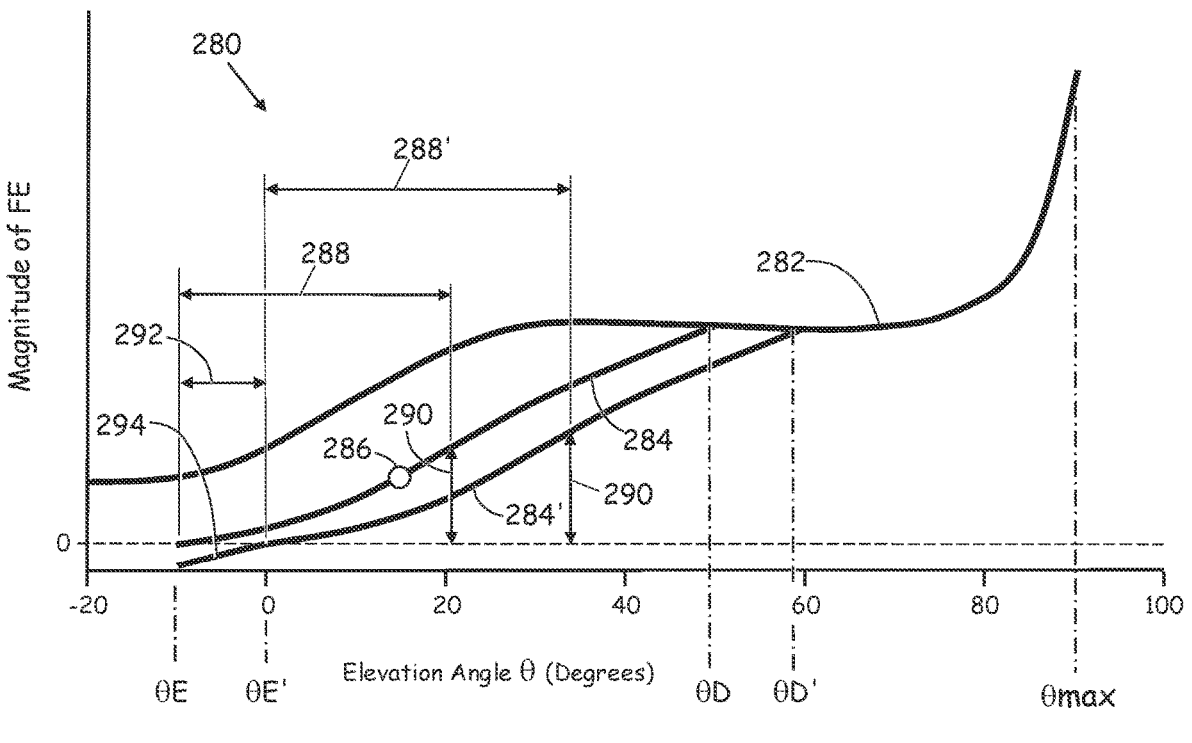
FIG. 21 is a graph of a characteristic exerted force-versus-position profile for raising a lift assisted tow bar from the lowered configuration to the raised configuration in comparison to a counterpart conventional tow bar assembly without the lift assist system according to an embodiment of the disclosure.

Referring to FIG. 21, a representative comparison graph 280 for raising the tow bar assembly 34 with and without the lift assist system 70$a$ is depicted according to an embodiment of the disclosure. The representative comparison graph 280 presents the magnitude of an exerted force FE versus the elevation angle $\theta$. The exerted force FE is representative of the lifting force required of operating personnel to raise the tow bar assembly 34 at a given elevation angle $\theta$. The elevation angle $\theta$ is presented as relative to the reference plane 66 (i.e., the horizontal configuration 63).

An unassisted force 282 is the exerted force vector FE as required for an "unassisted rotation" of the tow bar assembly 34, wherein the tow bar 40 is rotated upward without benefit of the lift assist system 70, 70$a$. An assisted exertion force 284 represents the magnitude of the exerted force vector FE required with the lift assist system 70, 70$a$ in operation. The elevation angles $\theta$ for the profiles of forces 282 and 284 range from the equilibrium elevation angle $\theta E$ of the lowered configuration 62 ($\theta E$ approximately $-10$ degrees) to the raised configuration 64 ($\theta$max approximately 90 degrees).

The data from which the profile of the unassisted force 282 is derived were taken with a hand-held spring scale attached to the free end 60 of the tow bar 40 of a tow bar actuated brake system. The hand held spring scale was maintained substantially perpendicular to the tow bar axis 56 at known vertical elevations from which the elevation angles $\theta$ were calculated.

The assisted exertion force 284 is derived from a single data point 286 taken at an elevation angle of 15 degrees, where a ratio of the assisted exertion force 284 to the unassisted exertion force 282 was measured at 42%. The profile of the assisted exertion force 284 is derived assuming a constant spring rate for the elastic support 82 from the lowered configuration 62 to a disengagement angle $\theta D$ where the load assembly 78 becomes decoupled from the tow bar assembly 34 or otherwise exerts a negligible force on the tow bar assembly 34. The assisted exertion force 284 further assumes 100% lift assist (zero exerted force vector FE requirement) in the lowered configuration 62 and zero lift assist (full exerted force vector FE requirement) at a disengagement angle $\theta D$ of 50 degrees.

The profile of the unassisted exertion force 282 indicates an increasing magnitude for the exerted force vector FE at the lower elevation angles $\theta$ followed by substantial plateauing of the force-versus-elevation angle across midrange elevation angles $\theta$. These portions of the profile of the unassisted exertion force 282 represent the forces to rotate the tow bar assembly 34 upward at a given elevation angle $\theta$, which includes overcoming the downward moment MD, translation of the brake system 152, various miscellaneous frictional forces, and, as the upright position is approached, the setting of the brake bars 154 against the rear tires 38.

Inspection of FIGS. 3 through 5 reveals that a horizontal distance between the weight W at the center of gravity CG generates a maximum downward moment in the horizontal configuration 63 ($\theta=0$), where the moment arm to the weight vector W is greatest. Accordingly, the downward moment MD decreases as the elevation angles $\theta$ deviate from the horizontal configuration 63. Accordingly, because the exerted force FE trends upward beyond the rotation angle $\theta$ of zero, it appears that the frictional and other forces become greater than the decrease in the magnitude of the downward moment MD as the tow bar assembly 34 is rotated upward.

As the elevation angle $\theta$ approaches the raised configuration 64 ($\theta=\theta$max), the magnitude of the exerted force FE for the unassisted exertion force 282 increases sharply. The increase is caused by the setting of the brake assembly 152, including engagement of the brake bars 154 with the tires 38 (FIG. 9). The increased exertion force required by the brake assembly 152 for setting the brake bars 154 is reflected by the increase in the magnitude of the FE proximate the maximum elevation angle $\theta$max.

An elevation assistance range 288 is defined herein as a range of elevation angles $\theta$ wherein an exertion ratio 290 of the assisted exertion force FE to the unassisted exertion force FE is less than 0.5. For the representative comparison graph 280, the baseline elevation assistance range 288 is about 30 degrees, from elevation angles $\theta$ of $-10$ degrees to about 20 degrees. The baseline elevation assistance range 288 can be increased or decreased by changing the spring rate of the elastic support 82, 82$a$.

The representative comparison graph 280 also presents an assistance interval offset 292. For a given elastic support 82, the assistance interval offset 292 may be attained by adjusting the equilibrium length 100 of the load assembly 78, 78$a$, for example by insertion or removal of axial spacers 88, 88', adjustment of the pivot connector 84 along the actuation shaft 72, axial repositioning of the support bracket 74 (e.g., of the integrated bracket assembly 110), adjustment of the adjustable spacer assembly 240, 248, or a combination thereof. The effect of the assistance interval offset 292 is to change the elevation angles $\theta$ over which the baseline elevation assistance range 288 operates. For the representative comparison graph 280, the assistance interval offset 292 illustrated is $+10$ degrees, from $-10$ degrees to zero degrees. A result of the assistance interval offset 292 is a shifted equilibrium elevation angle $\theta E'$ that offsets a shifted elevation assistance range 288'. A shifted elevation assistance range 288', again determined by the elevation angle $\theta$ at which the exertion ratio 290 is less than 0.5, is about 34 degrees (from zero degrees to about 34 degrees), for a shifted disengagement angle $\theta D'$ of about 59 degrees the on the representative comparison graph 280.

The assistance interval offset 292 also has the effect of changing the equilibrium height H of the free end 60 of the tow bar 40. That is, shifting the baseline elevation assistance range 288 to higher elevation angles $\theta$ will increase the equilibrium height H; shifting the baseline elevation assistance range 288 to lower elevation angles $\theta$ will decrease the equilibrium height H. If the baseline elevation assistance range 288 was set for a desired elevation height, shifting the baseline elevation assistance range 288 to higher elevation angles $\theta$ will cause the equilibrium height to settle above the desired height.

The load assembly 78, 78$a$ may be tailored so that the desired height of the tow bar 40 is readily and actively achieved by applying a negative force 294 (pushing down) on the tow bar assembly 34 when in the lowered configuration 62. In some embodiments, the elastic support 82 may be dimensioned so that the equilibrium length 100 is achieved without approaching full compression of the elastic support 82 (e.g., without approaching an intra-coil contact or "bottoming out" condition). Such embodiments provide additional deflective range, such that overstressing of the components of the load assembly 78, 78$a$ may be alleviated.

Accordingly, the downward moment MD of the tow bar assembly 34 is already at equilibrium with the load assembly 78, 78a, so that a small downward force may urge the free end 60 of the tow bar 40 downward to the desired height. In some embodiments, application of a downward force of less than 30 pounds-force lowers the elevation angle θ of the tow bar assembly 34 below the equilibrium angle θE from 5 degrees and 20 degrees inclusive; in some embodiments, between 10 degrees and 20 degrees inclusive.

The assistance interval offset may also have the effect of changing the dimension of the gap γ. Assistance interval offsets 292 directly affect the dimension of the gap γ, such that offsets to lower elevation angles θ reduces the gap γ and offsets to higher elevation angles increases the gap γ. As such, readjustment of the gap γ may be concomitant with the imposition of the assistance interval offset 292, to prevent premature engagement of the stop assembly 104 for offsets to lower elevation angles θ or intra-coil contact for offsets to higher elevation angles θ.

Functionally, the profile of the assisted exertion force 284 illustrates how the cam-actuated lift assist system 70a can substantially reduce the exerted force vector FE required to rotate the tow bar 40 at the lower elevation angles θ. Ergonomically, assistance at the lower elevation angles θ is desirable to avoid the need for high exertion forces when operating personnel are stooped over to pick up the tow bar 40, which can cause spinal and abdominal injuries. As the tow bar 40 is rotated to higher elevation angles θ, operating personnel are in a more erect posture and in less need of assistance, despite higher exerted force vector FE requirements.

The shape of the profile of the assisted exertion force 284 is non-limiting, but instead representative of the exerted force vector FE requirement for the lift assist system 70a having a constant spring rate and a disengagement angle θD of 50 degrees. Persons of ordinary skill in the relevant arts will recognize, in light of this disclosure, that other assisted exertion force 284 may be effected, for example by changing the spring rate of the elastic support 82, the disengagement angle θD of the tow bar assembly 34, and/or implementation of a variable spring rate. Accordingly, the lift assist system 70, 70a may be tailored to suit specific applications. In some embodiments, the elevation assistance range is between 10 degrees and 60 degrees inclusive; in some embodiments, between 15 degrees and 45 degrees inclusive; in some embodiments, between 15 and 30 degrees inclusive.

The towed vehicle 30 depicted in FIGS. 1 through 12 is a cargo dolly 30a, which is a non-limiting aspect of the disclosure. That is, the lift assist system 70, 70a as well as any brake system with which the lift assist system 70, 70a can be integrated may be implemented into towed vehicles 30 other than the cargo dolly 30a. Examples include airline baggage carts, mobile decking, and ground support equipment generally.

Figures 22, 23, 24:
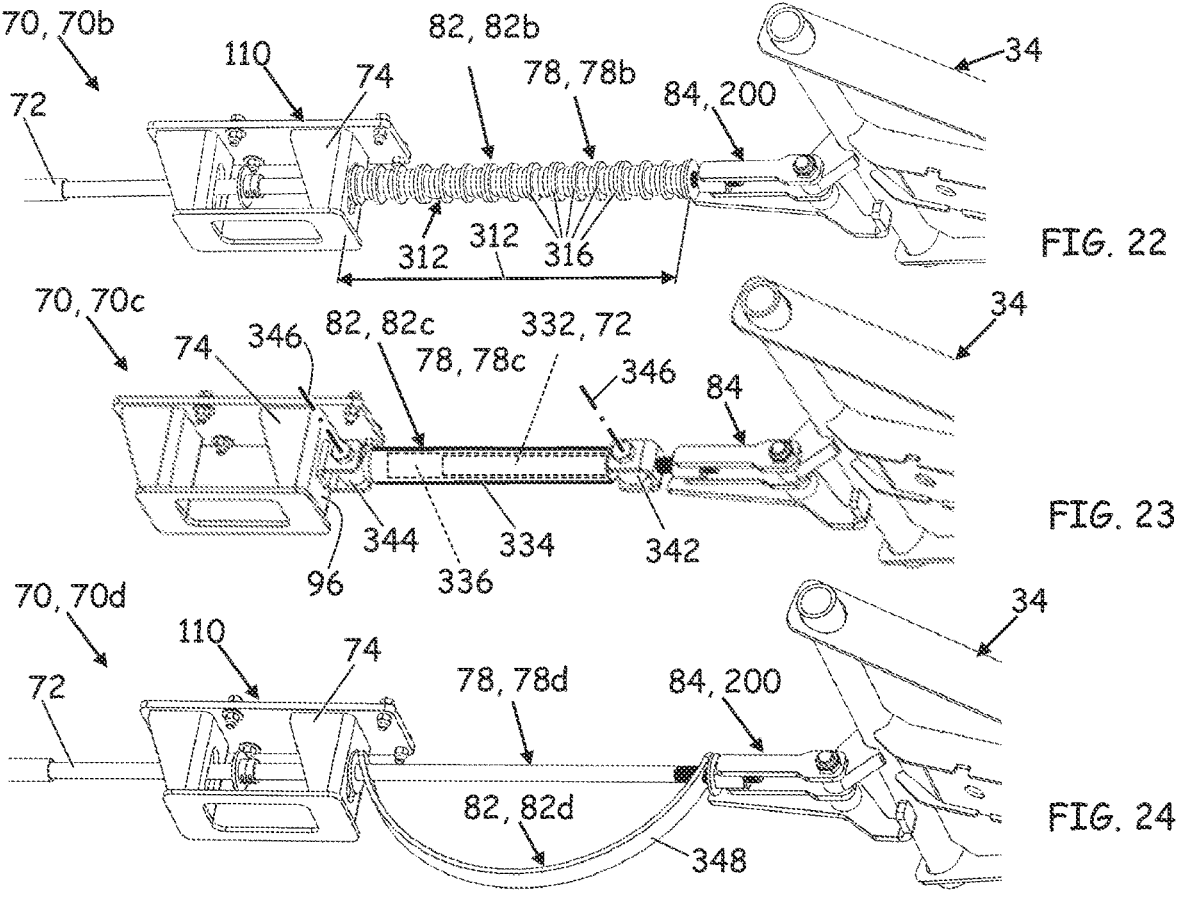
FIG. 22 is an isolated, lower perspective view of a lift assist system utilizing a single column of a plurality of dampers as the elastic support according to an embodiment of the disclosure.
FIG. 23 is an isolated, lower perspective view of a lift assist system utilizing a gas shock as the elastic support according to an embodiment of the disclosure.
FIG. 24 is an isolated, lower perspective view of a lift assist system utilizing a leaf spring as the elastic support according to an embodiment of the disclosure.

Referring to FIGS. 22 through 24, additional configurations for lift assist systems 70 are depicted according to embodiments of the disclosure. The lift assist systems 70b, 70c, and 70d include alternative ways to configure the load assemblies 78b, 78c, and 78d. The accompanying elastic supports 82b, 82c, and 82d, respectively, are alternatives to the compression spring use for the single compression spring column 82a of lift assist system 70a.

The load assembly 78b for lift assist system 70b (FIG. 22) includes a single compression damper column 82b that comprises a plurality of dampers 312 arranged in series. The plurality of dampers 312 are configured so that the cumulative effect provides a desired spring rate and assembly length 314. Individual dampers 316 may be of the same or different spring rates, and may be of the same or different axial lengths. The number of individual dampers 316 may also be increased or decreased to affect the equilibrium length 100 of the lift assist system 70, 70b, akin to the use of spacers 88, 88' for the lift assist system 70a. The load assembly 78a may implement the various ways of setting and adjusting the equilibrium length 100 as disclosed herein. Individual dampers 316 may also be utilized with the single compression spring column 82a as a way to vary both the equilibrium length 100 and the spring rate of the lift assist system 70a.

The load assembly 78c for lift assist system 70c (FIG. 23) includes a gas shock 82c as the elastic support 82. The gas shock 82c includes an inner plunger 332 that slides within an outer cylinder 334 to define a sealed variable length chamber 336 within which gas is captured and compressed to effect a spring rate. The inner plunger 332 and outer cylinder 334 are coupled to forward and rearward pivot mounts 342 and 344 defining pivot axes 346 that extend laterally. For the gas shock 82c as depicted, the inner plunger 332 constitutes the actuation shaft 72, which terminates at an interface of the sealed variable length chamber 336. Alternatively, the gas shock 82c may be reversed (not depicted) so that the outer cylinder 334 constitutes the actuation shaft 72. The forward pivot mount 342 is connected the pivot connector 64 and the rearward pivot mount 344 is secured to the support bracket 74, for example by welding or with a fastener (not depicted) that anchors the rearward pivot mount 344 to the registration surface 96 of the support bracket 74. The load assembly 78c may implement the various ways of setting and adjusting the equilibrium length 100 as disclosed herein.

Functionally, the gas shock 82c as disclosed provides lift assist to the tow bar assembly 34 without extension of the actuation shaft 72 through the support bracket 74. As such, when the gas shock 82c as depicted constitutes the actuation shaft 72, there is no extension of the actuation shaft 72 through the support bracket 74 for actuation of the brake assembly 152 or for implementation of the stop assembly 104. The laterally arranged pivot axes 346 compensate for elevation changes of the pivot connector 64 as the tow bar assembly is rotated.

The load assembly 78d for lift assist system 70d (FIG. 24) includes a single leaf spring column 82d that comprises one or more leaf springs 348. As with the single compression spring column 82a, a plurality of leaf springs (not depicted) may be arranged in parallel, and may be of different spring rates and lengths. The load assembly 78d may implement the various ways of setting and adjusting the equilibrium length 100 as disclosed herein.

Figure 25:
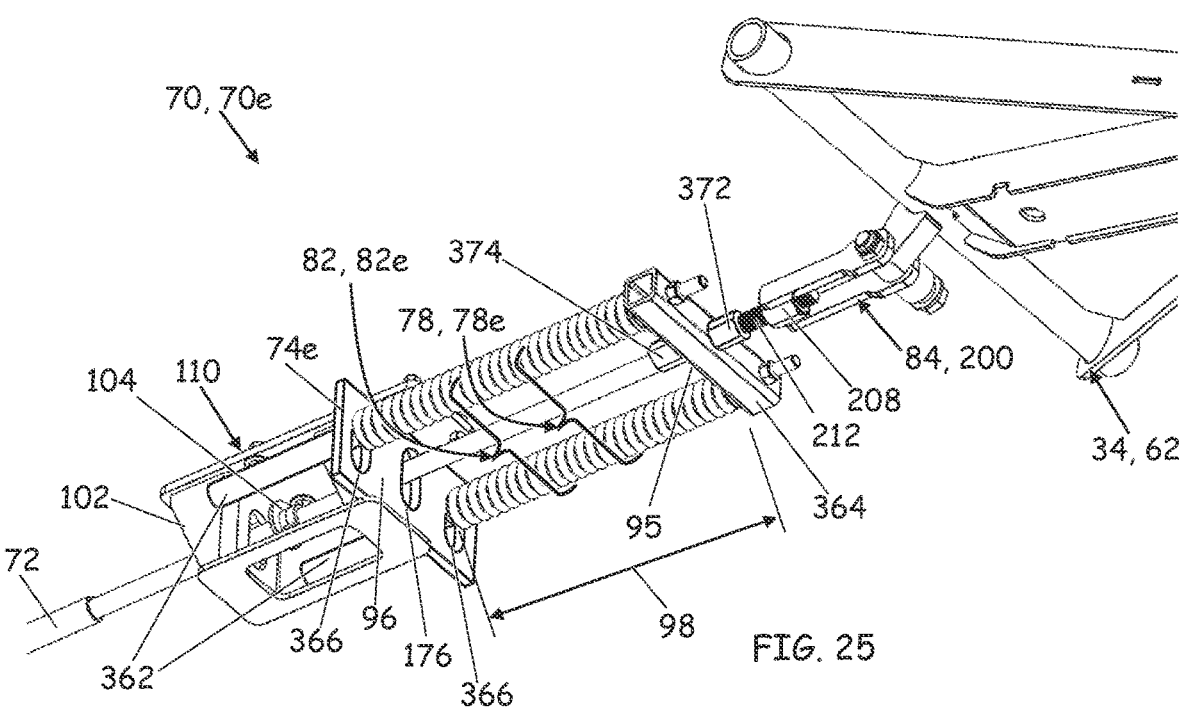
FIG. 25 is an isolated, lower perspective view of a lift assist system utilizing parallel compression spring columns as the elastic support according to an embodiment of the disclosure.

Referring to FIG. 25, a lift assist system 70e is depicted according to an embodiment of the disclosure. The lift assist system 70e may include some of the same components and attributes as the lift assist systems 70a through 70d, some of which are indicated with same-labeled reference characters. A distinction of the lift assist system 70e is that the elastic support 82 is a plurality of parallel compression spring columns 82e. As such, the compressive elastic supports 82a, 82b, 82c, and 82d may be utilized in the parallel compression spring columns 82e. The parallel compression spring columns 82e are supported by guide rods 362 that extend axially from a crosspiece 364, the crosspiece 364 extending laterally from the actuation shaft 72. In some embodiments, an expanded support bracket 74e defines guide apertures 366 through which the guide rods 362 may be extended. In some embodiments, a third parallel elastic support (not depicted) may be routed over the actuation shaft 72 for coupling to the expanded support bracket 74*e* about the through-aperture 176, as with the lift assist system 70*a*.

The crosspiece 364 may define a central through-aperture 368 (FIG. 29) dimensioned to slide over the external threads 212 of the forward end 92 the actuation shaft 72. The crosspiece 364 may be captured between fixtures 372 and 374. The fixtures 372, 374 may be jam nuts (depicted) that are coupled to the external threads 212 to secure the crosspiece 364 in a fixed relationship to the actuation shaft 72. Alternatively, the crosspiece 364 may be captured between the fixture 374 and the threaded connector 208 of the yoke assembly 200. In some embodiments, the fixtures 372, 374 may be shaft collars (not depicted in FIG. 26, but represented at FIG. 18). Accordingly, the load assembly 78*e* for the lift assist system 70*e* includes the crosspiece 364 and fixtures 372 and/or 374, as well as the elastic support 82, pivot connector 84, and the support bracket 74. The crosspiece 364 may be formed, for example, of structural tubing (depicted), bar stock, channel stock, formed plate, or a bracket structure.

Functionally, the parallel arrangement of the elastic supports 82 provide another configuration for establishing of the assistance force FA exerted on the tow bar assembly 34 that may be advantageous in certain applications. For example, the parallel compression spring columns 82*e* may be of lighter duty because the assistance force FA is shared between two (or more) parallel elastic supports 82. The ability to slidingly position the crosspiece 364 over the actuation shaft 72 enables adjustment of the displaced lengths 98 of the parallel elastic supports 82, akin to the spacers 88 of the lift assist system 70*a*.

The plurality of parallel compression spring columns 82*e* may be substituted for other elastic supports 82. For example, persons of ordinary skill in the relevant arts will recognize, in light of this disclosure, how to implement the various elastic supports 82*b*, 82*c*, and 82*d* mutatis mutandis into the load assembly 78*e*. It is noted that, when implementing the gas shock 82*c* into the load assembly 78*e*, neither the inner plunger 332 nor the outer cylinder 334 constitutes the actuation shaft 72. Rather, the inner plunger 332 or the outer cylinder 334 would constitute the guide rod 362. Accordingly, when implementing the gas shock 82*c* into the load assembly 78*e*, the actuation shaft 72 may extend through the support bracket 74 for actuation of the brake assembly 152 and/or for implementation of the stop assembly 104.

Figures 26, 27:
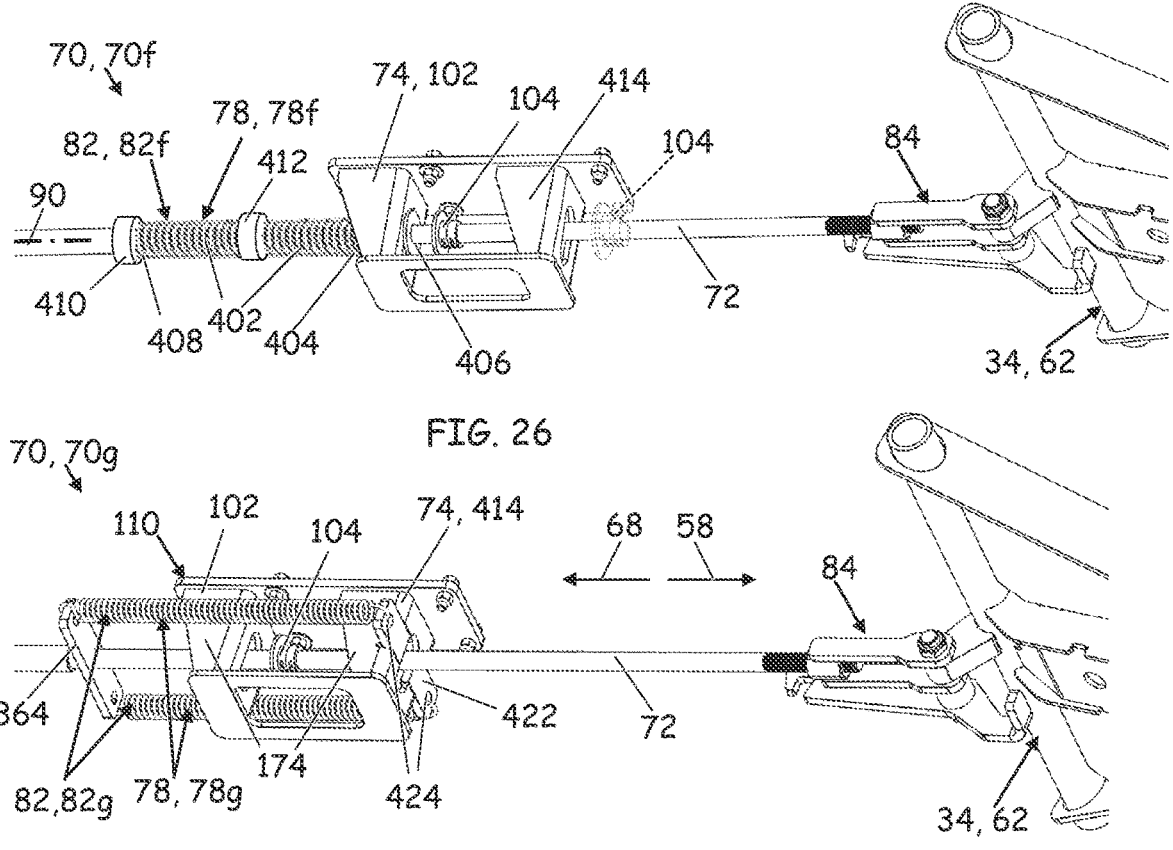
FIG. 26 is an isolated, lower perspective view of a lift assist system utilizing a single elastic spring column as the elastic support according to an embodiment of the disclosure.
FIG. 27 is an isolated, lower perspective view of a lift assist system utilizing parallel extension spring columns as the elastic support according to an embodiment of the disclosure.

Referring to FIG. 26, a lift assist system 70*f* having a load assembly 78*f* that utilizes a single extension spring column 82*f* as the elastic support 82 is depicted according to an embodiment of the disclosure. The single extension spring column 82*f* includes one or more extension springs 402 arranged in series. The single extension spring column 82*f* is affixed to the support bracket 74 at a forward end 404 with an extension spring mount 406, and at a rearward end 408 to the actuation shaft 72 with an extension spring clamp 410. An extension spring union 412 may be used to couple a plurality of extension springs 402 in series. The extension spring mount 406, spring clamp 410, and spring union 412 are configured to secure the extension springs 402 under tension loads. For the depicted embodiment, the actuation shaft 72 is routed through the single extension spring column 82*f* so that the extension springs 402 are colinear with the actuation axis 90. For the depicted embodiment, the support bracket 74 may also engage the stop assembly 104, effectively functioning as the stop bracket 102. Alternatively, the stop assembly 104 (depicted in phantom) may be located forward of the integrated bracket assembly 110 to engage a forward bracket 414 of the integrated bracket assembly 110 for the stop function, in which case the forward bracket 414 functions as the stop bracket.

Referring to FIG. 27, a lift assist system 70*g* having a load assembly 78*g* that utilizes a plurality of parallel extension spring columns 82*g* as the elastic support 82 is depicted according to an embodiment of the disclosure. The load assembly 78*g* may include the crosspiece 364 of the load assembly 78*e*, fixedly coupled to the actuation shaft 72 in the rearward direction 68 from the support bracket 74. The crosspiece 364 may be permanently fixed (depicted) to the actuation shaft 72, for example by welding, or may implement the fixtures 372, 374 as described for the load assembly 78*e*. The parallel extension spring columns 82*g* may be coupled to the support bracket 74, for example using a crossbar 422 that extends laterally from the support bracket 74 (depicted). The cross bar 422 may define eyelets 424 to which the parallel extension spring columns 82*g* are coupled. Alternatively, the eyelets 424 may be defined by the gussets 174 of the support bracket 74. For the depicted embodiment, the forward bracket 414 of the integrated bracket assembly 110 is utilized as the support bracket 74. Alternatively, the stop bracket 102 may also function as the support bracket 74, with the lateral crossbar 422 extending therefrom or, alternatively, the eyelets 424 being formed in the gussets 174 of the stop bracket 102.

Functionally, the lift assist systems 70*f* and 70*g* operates similar to the lift assist systems 70*a* and 70*e*, respectively, with the elastic support 82 acting in tension instead of compression. A person of ordinary skill in the relevant arts recognizes, in light of this disclosure, that the various lift assist systems 70 disclosed herein is not necessarily limited to load assemblies 78 that operate in compression, and that various operation characteristics apply for embodiments where the deformation of the elastic support is in either compression or tension. Such operation characteristics include, but are not limited to: suspension of the tow bar 40 at an equilibrium height H; the range of elevation angles over which lift assistance is provided; contingency operation Referring to FIG. 27, a method 440 for assembling the various lift assist systems 70 is depicted according to an embodiment of the disclosure. The method 440 is described in terms of the lift assist systems 70*a* and 70*e*, but is applicable mutatis mutandis to the other lift assist systems 70 presented herein, as a person of ordinary skill in the relevant arts understands in light of this disclosure. It is also understood that the steps of the method 440 need not be followed in the order depicted, and that not all steps outlined above need be followed in all installations.

For the lift assist system 70*a*, the method 440 includes routing the actuation shaft 72 through the support bracket 74 (s442), for example via the through-aperture 176. The support bracket 74 is mounted the chassis 32 (s444). In some embodiments, the support bracket 74 is mounted beneath or within the chassis 32 to support routing of the actuation shaft 72 through the chassis 32. The elastic support 82 is coupled to the actuation shaft 72 for registration of the elastic support 82 against the support bracket 74 (s446). In some embodiments, the coupling of the elastic support 82 is accomplished by sliding the elastic support 82 over the actuation shaft 72 for collinearity with the actuation axis 90.

In some embodiments, the actuation shaft 72 is also routed through the stop bracket 102 (s448) and the stop bracket mounted to the chassis 32 (s450). The stop assembly 104 is secured to the actuation shaft 72 to effect the secondary height H' prior to the contingency coupling (s452), for example by setting the stop assembly 104 to define the gap γ with the stop bracket 102. The support bracket 74 and stop bracket 102 may be supplied individually or as the integrated bracket assembly 110 (depicted). For embodiments including the integrated bracket assembly 110, steps S442 and S448 as well as steps S444 and s450 may be performed concurrently. For towed vehicles so equipped, the support bracket 74 and stop bracket 102 (or integrated bracket assembly 110) may be mounted to the flexible suspension members 112'.

The axial spacer(s) 88 may be coupled to the elastic support 82 (s454). In some embodiments, the axial spacer(s) 88 are slid over the actuation shaft 72 for collinearity with the actuation axis 90. As described above, the axial spacer(s) 88 may be coupled in a variety of ways with the elastic support 82.

In some embodiments, the pivot connector 84 may be selectively positioned along the actuation shaft 72 (s456). The positioning may be accomplished by threading the yoke assembly 200 along the outer threaded length 214 of the external threads 212 at the forward end 92 of the actuation shaft 72. In some embodiments, particularly where the lift assist system 70a utilizes an existing actuation shaft 72 (e.g., for a tow bar actuated brake system), the external threads 212 may need to be formed anew or extended to increase the outer threaded length 214 of the external threads 212 to provide an ample range of positioning for the pivot connector 84. Such modification of the external threads 212 can be made in the field with standard thread cutting dies. Other ways of varying the position of the yoke assembly 200 along the actuation shaft 72 are contemplated, including with a pin (not depicted) that is set within one of a plurality of through holes (not depicted) defined by and spaced axially along the actuation shaft 72, or with a clamp (not depicted) is used instead of the threaded connector 208, the clamp being set to grip the exterior of the actuation shaft 72.

The actuation shaft 72 is coupled to the tow bar assembly 34 of the towed vehicle 30 (s458), thereby securing the components of the lift assist system 70, 70a. The tow bar assembly 34 may be oriented in the lowered configuration 62 and the equilibrium height H checked for compliance within a desired tolerance. If not within the desired tolerance, the equilibrium height H may be altered by disconnecting the actuation shaft 72 from the tow bar assembly 34 and performing or reperforming the steps outlined for the method 440.

For the lift assist system 70e, steps s444 and s446 are modified. The expanded support bracket 74e is mounted to the chassis 32 in step s444. The expanded support bracket 74e may be part of the integrated bracket assembly 110. For step s446, the guide rods 362 are mounted to the crosspiece 364 and the parallel compression spring columns 82e slid over the guide rods 362. The fixture 374 is positioned axially along the actuation shaft 72. The subassembly of the guide rods 362, crosspiece 364, and columns 82e is coupled to the actuation shaft 72 by sliding the central through-aperture 368 of the crosspiece 364 over the actuation shaft 72 to abut the fixture 374. Concurrently, the guide rods 362, with the parallel compression spring columns 82e assembled thereon, are routed through the guide apertures 366 to capture the columns 82e between the crosspiece 364 and the expanded support bracket 74e. The other fixture 372 is axially positioned along the actuation shaft 72 and secured against crosspiece 364 to fix the crosspiece 364 to the actuation shaft 72. Alternatively, instead of the fixture 372, the yoke 200 is secured against the crosspiece 364.

Figure 29:
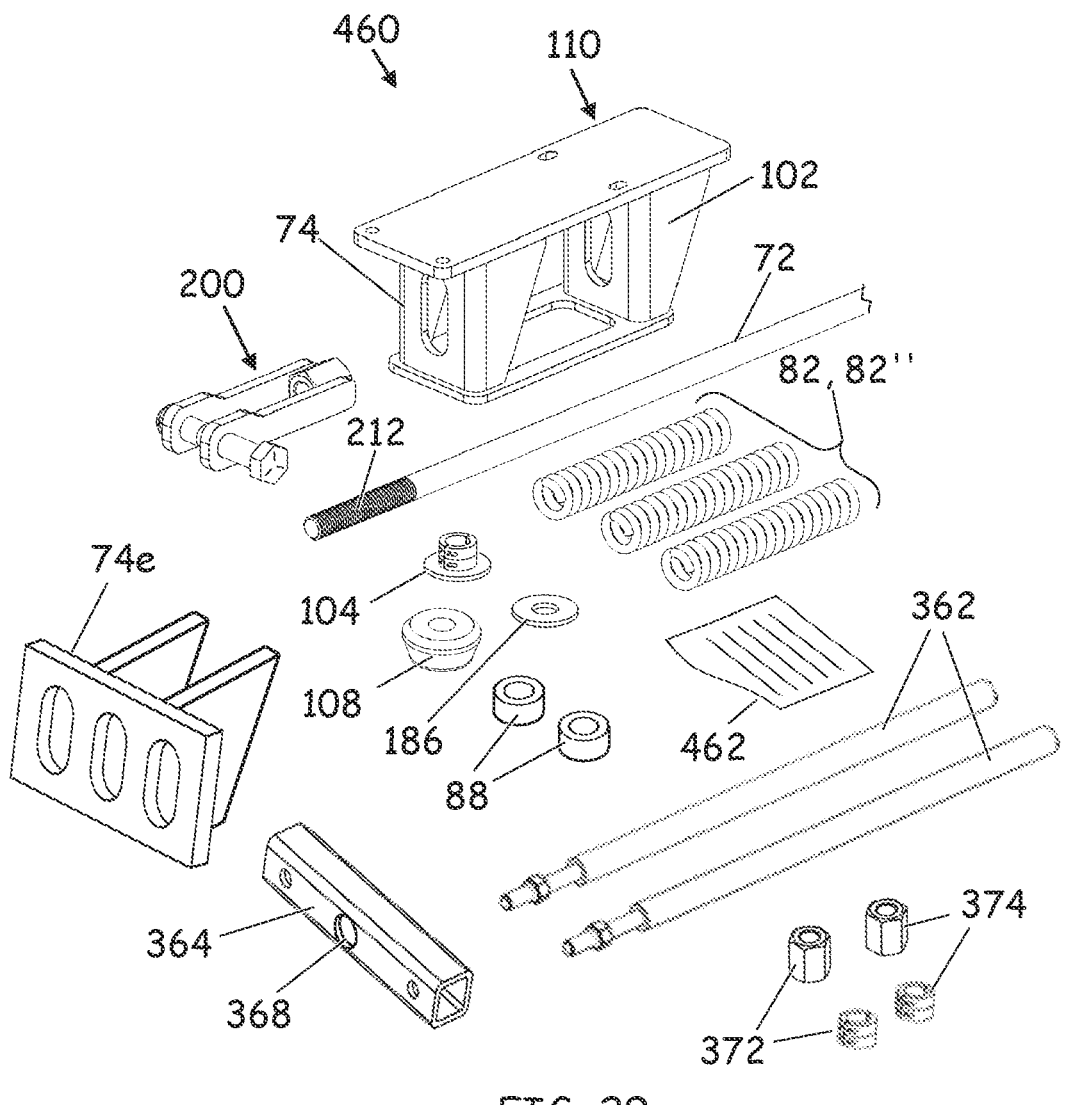
FIG. 29 is a perspective view of a retrofit kit for a lift assist system according to an embodiment of the disclosure.

Referring to FIG. 29, a kit 460 for retrofitting an existing tow bar actuated brake system with the lift assist system 70 is depicted according to an embodiment of the disclosure. The kit 460 may include some or all of the following components suitable for assembly of the lift assist system 70a: the elastic support(s) 82 (e.g., serial elastic supports 82", depicted); the support bracket 74; the stop bracket 102; the yoke assembly 200; the axial spacer(s) 88, 88'; and the actuation shaft 72. In some embodiments, the kit 460 may include additional components suitable for assembly of the parallel lift assembly 70e, including: the expanded support bracket 74e; fixture(s) 372, 374 (e.g., jam nuts and/or shaft collars); and guide rods 362. The kit may also include installation instructions 462. The installation instructions 462 are provided on a tangible, non-transitory medium, and may be physically included with the kit 460 such as on a printed document (depicted), compact disc, or flash drive. Non-limiting examples of a tangible, non-transitory medium include a paper document and computer-readable media including compact disc and magnetic storage devices (e.g., hard disk, flash drive, cartridge, floppy drive). The computer-readable media may be local or accessible over the internet. The installation instructions 462 may be complete on a single medium, or divided among two or more media. For example, some of the installation instructions 462 may be written on a paper document that instruct the user to access one or more of the steps of the method over the internet, the internet-accessible steps being stored on a computer-readable medium or media. The installation instructions 462 may embody the techniques and methods depicted or described herein (e.g., method 440) using text, photos, videos, or a combination thereof to instruct and guide the user. The instructions may be in the form of written words, figures, photos, video presentations, or a combination thereof to instruct and guide the user.

Herein, various directional and spatial terminology is related to the Cartesian coordinate system depicted in FIG. 1. The Cartesian coordinate system is of arbitrary origin, with the x-coordinate being collinear with the actuation axis 90 of the lift assist system 70. "Forward" and derivations thereof refers to a direction that is parallel to the x-coordinate towards the positive direction. "Rearward" and derivations thereof refers to a direction that is parallel to the x-coordinate towards the negative direction. "Lateral" and derivations thereof refers to a direction parallel to the y-coordinate. "Vertical" and derivations thereof refer to a direction that is parallel to the z-coordinate. "Horizontal" and derivations thereof refer to a direction parallel to a plane defined by the x- and y-coordinates. "Axial" and derivations thereof refer to a direction that is parallel to the x-coordinate. "Upper" and "above" refer to a direction that is parallel to the z-coordinate towards the positive direction. "Beneath", "lower", and "under" and derivations thereof refer to a direction that is parallel to the z-coordinate towards the negative direction. "Radial" and derivations thereof refers to a direction perpendicular to an arbitrary axis. "Tangent" refers to a direction about an arbitrary axis that is orthogonal to and radially offset from the axis.

Various aspects may be incorporated into the cargo dolly 30a as described in detail at U.S. patent application Ser. No. 16/751,595 to Hoeper et al., filed Jan. 24, 2020, International Publication No. WO 2019/108912 to Hoeper et al., published Jun. 6, 2019, U.S. Patent Application Publication No. 2020/0156873 to Baer, published May 21, 2020, and U.S. Provisional Patent Application No. 63/252,445 to Venem, filed Oct. 5, 2021, all assigned to the owner of the present application. The depiction of the cargo dolly 30a as the towed vehicle 30 on which the tow bar assembly 34 is utilized is non-limiting. That is, the tow bar assembly 34 may be implemented on other towed vehicles, such as but not limited to baggage carts, mail carts, and supply trailers, for aircraft ground support equipment as well as other purposes.

The following are incorporated by reference herein in their entirety except for patent claims and express definitions contained therein: U.S. Provisional Patent Application No. 62/660,339 to Hoeper et al., filed Apr. 20, 2018; U.S. patent application Ser. No. 17/960,601 to Venem, filed Oct. 5, 2022; U.S. Pat. No. 9,744,955 to Hoeper et al., filed Jan. 19, 2016; U.S. patent application Ser. No. 16/751,595 to Hoeper et al., filed Jan. 24, 2020; International Publication No. WO 2019/108912 to Hoeper et al., published Jun. 6, 2019; U.S. Patent Application Publication No. 2020/0156873 to Baer, published May 21, 2020; and U.S. Provisional Patent Application No. 63/252,445 to Venem, filed Oct. 5, 2021.

Each of the additional figures and methods disclosed herein can be used separately, or in conjunction with other features and methods, to provide improved devices and methods for making and using the same. Therefore, combinations of features and methods disclosed herein may not be necessary to practice the disclosure in its broadest sense and are instead disclosed merely to particularly describe representative and preferred embodiments.

Various modifications to the embodiments may be apparent to one of skill in the art upon reading this disclosure. For example, persons of ordinary skill in the relevant arts will recognize that the various features described for the different embodiments can be suitably combined, un-combined, and re-combined with other features, alone, or in different combinations. Likewise, the various features described above should all be regarded as example embodiments, rather than limitations to the scope or spirit of the disclosure.

Persons of ordinary skill in the relevant arts will recognize, in view of this disclosure, that various embodiments can comprise fewer features than illustrated in any individual embodiment described above. The embodiments described herein are not meant to be an exhaustive presentation of the ways in which the various features may be combined. Accordingly, the embodiments are not mutually exclusive combinations of features; rather, the claims can comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no patent claims included in the documents are incorporated by reference herein. Any incorporation by reference of documents above is yet further limited such that any definitions provided in the documents are not incorporated by reference herein unless expressly included herein.

Unless indicated otherwise, references to "embodiment (s)", "disclosure", "present disclosure", "embodiment(s) of the disclosure", "disclosed embodiment(s)", and the like contained herein refer to the specification (text, including the claims, and figures) of this patent application that are not admitted prior art.

For purposes of interpreting the claims, it is expressly intended that the provisions of 35 U.S.C. 112(f) are not to be invoked unless the specific terms "means for" or "step for" are recited in the respective claim.

What is claimed is:

1. A towed vehicle with tow bar lift assist system, comprising:

a chassis supported by a plurality of tire assemblies, wherein lower extremities of said tire assemblies define a ground plane;

a pivot pin coupled to said chassis and defining a pivot axis;

a tow bar assembly coupled about said pivot pin for rotation about said pivot axis, said tow bar assembly including a tow bar that defines a tow bar axis that is perpendicular to said pivot axis and extends through a free end of said tow bar, said tow bar assembly including a linkage arm that extends radially outward from said pivot axis; and a lift assist system, including a pivot connector directly connected to said linkage arm of said tow bar assembly, an actuation shaft coupled to said pivot connector and extending beneath or through said chassis, and an elastic support that extends beneath or through said chassis and is coupled to said actuation shaft, wherein:

a reference plane is defined as being coplanar with said pivot axis and parallel to said ground plane;

said tow bar defines a lowered configuration wherein said free end of said tow bar is below said reference plane;

said tow bar defines a horizontal configuration wherein said tow bar axis is coplanar with said reference plane;

said elastic support exerts an assistance force on said actuation shaft to generate an upward moment of said tow bar assembly about said pivot axis, said upward moment A suspending said free end of said tow bar at an equilibrium height above said ground plane in said lowered configuration, said tow bar axis defining an equilibrium angle relative to said reference plane at said lowered configuration; and said upward moment is generated from said lowered configuration through said horizontal configuration.

2. The towed vehicle of claim 1, comprising a support bracket to which said elastic support is coupled for generation of said assistance force.

3. The towed vehicle of claim 2, wherein:

a load assembly includes said pivot connector, said elastic support, and said support bracket;

an actuation length of said load assembly is defined from a pivot axis of said pivot connector to a rearward registration surface defined by said support bracket;

said actuation length defines an equilibrium length when said tow bar assembly is in said lowered configuration; and means for changing said equilibrium length.

4. The towed vehicle of claim 3, comprising means for shifting said equilibrium length along said actuation axis.

5. The towed vehicle of claim 2, wherein said support bracket coupled to and beneath or within said chassis.

6. The towed vehicle of claim 1, wherein:

an elevation angle is defined between said tow bar axis and said reference plane;

an equilibrium angle is defined as said elevation angle in said lowered configuration;

an elevation assistance range is defined as a range of said elevation angle wherein a ratio of an exertion force required for upward rotation of said tow bar assembly with said lift assist system to an exertion force require for upward rotation of said tow bar assembly without said lift assist system is less than 0.5; and said elevation assistance range includes said lowered configuration and said horizontal configuration.

7. The towed vehicle of claim 1, comprising:

a stop assembly coupled to said actuation shaft; and a stop bracket positioned for engagement of said stop assembly when said tow bar assembly is at an elevation angle that is below said equilibrium angle, said stop bracket being suspended from at least one flexible suspension member connected to said chassis, wherein:

a load assembly includes said pivot connector, said elastic support, and said support bracket;

when said stop assembly engages said stop bracket and deflects said at least one flexible suspension member, an axial deflection of said at least one flexible suspension member is greater than an axial deflection of said load assembly.

8. The towed vehicle of claim 1, wherein application of a downward force of less than 30 pounds force on said tow bar assembly lowers the elevation angle below said equilibrium angle from 10 degrees to 20 degrees inclusive.

* * * * *